United States Patent [19]
Honda

[11] Patent Number: 6,020,885
[45] Date of Patent: *Feb. 1, 2000

[54] THREE-DIMENSIONAL VIRTUAL REALITY SPACE SHARING METHOD AND SYSTEM USING LOCAL AND GLOBAL OBJECT IDENTIFICATION CODES

[75] Inventor: Yasuaki Honda, Chiba, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,545

[22] Filed: Jul. 9, 1996

[30] Foreign Application Priority Data

Jul. 11, 1995 [JP] Japan .............................. P07-174578

[51] Int. Cl.[7] .................................................. G06F 15/16
[52] U.S. Cl. .......................... 345/332; 341/331; 341/339; 341/355; 707/104; 707/201; 709/203; 709/205
[58] Field of Search ..................................... 395/615, 617, 395/331, 335, 200.33, 200.35; 707/104, 201; 345/331, 335, 332, 339, 355; 709/203, 205

[56] References Cited

U.S. PATENT DOCUMENTS

| | | | |
|---|---|---|---|
| 5,251,300 | 10/1993 | Halliwell et al. ......................... | 709/228 |
| 5,315,709 | 5/1994 | Alston, Jr. et al. ........................ | 707/6 |
| 5,546,584 | 8/1996 | Lundin et al. ............................ | 709/303 |
| 5,588,104 | 12/1996 | Lanier et al. .............................. | 463/32 |
| 5,588,914 | 12/1996 | Adamczyk ................................. | 463/32 |
| 5,602,564 | 2/1997 | Iwamura et al. .......................... | 345/340 |
| 5,608,446 | 3/1997 | Carr et al. ................................... | 348/6 |
| 5,623,656 | 4/1997 | Lyons ......................................... | 707/10 |
| 5,625,408 | 4/1997 | Matsugu et al. ........................... | 348/42 |
| 5,625,818 | 4/1997 | Zarmer et al. ............................ | 707/104 |
| 5,633,993 | 5/1997 | Redmann et al. ........................ | 345/419 |
| 5,634,004 | 5/1997 | Gopinath et al. ......................... | 710/132 |
| 5,634,053 | 5/1997 | Noble et al. ................................ | 707/4 |
| 5,635,979 | 6/1997 | Kostreski et al. .......................... | 348/13 |
| 5,659,691 | 8/1997 | Durward et al. .......................... | 345/329 |
| 5,675,721 | 10/1997 | Freedman et al. ....................... | 345/502 |
| 5,815,156 | 9/1998 | Takeuchi .................................. | 345/419 |
| 5,826,266 | 10/1998 | Honda ......................................... | 707/9 |

FOREIGN PATENT DOCUMENTS

| | | | |
|---|---|---|---|
| 5-233779 | 9/1993 | Japan .............................. | G06F 15/62 |
| 2256567 | 12/1992 | United Kingdom ............ | G06F 15/72 |

OTHER PUBLICATIONS

* U.S. Patent Application No. 08/515,111, Filed AuG. 14, 1995, Kitano et al.
* U.S. Patent Application No. 08/520,618, Filed Aug. 30, 1995, Takeuchi.
* U.S. Patent Application No. 08/678,340, Filed Jul. 11, 1996, Rekimoto.
* U.S. Patent Application No. 08/680,224, Filed Jul. 11, 1996, Honda et al.

(List continued on next page.)

*Primary Examiner*—Kenneth S. Kim
*Attorney, Agent, or Firm*—Limbach & Limbach, LLP

[57] ABSTRACT

The dynamic control of object identification codes involved in the customization of virtual reality space objects, such as object addition and deletion, by users is facilitated. Each of client terminals 13-1 through 13-3 sets given local IDs obj101 through obj103 for a cylindrical object, a quadrangular prism object, and a conical object independently of the other client terminals. Tables T131 through T133 are registered in a server terminal 11-1 beforehand for the client terminals 13-1 and 13-3 respectively. The tables T131 through T133 each list the relationship between local IDs obj101 through obj103 of the objects controlled by the corresponding client terminal and the global IDs objA through objC controlled by the server terminal 11-1. Use of these tables T131 through T133 allows the client terminals 13-1 through 13-3 to separately set, add or delete the local IDs obj101 through obj103.

18 Claims, 27 Drawing Sheets

OTHER PUBLICATIONS

Proceedings: Human Factors in Computing Systems, Monterey, CA, May 3–7, 1992, ACM Press, USA, pp. 329–334, C. Codella et al., "Interactive Simulation in a Multi–Person Virtual World".

Proceedings: Computer Animation, Geneva, Switzerland, Apr. 19–21, 1995, IEEE Comput. Soc. Press, USA, pp. 44–49, G. Singh et al., "Networked Virtual Worlds".

Fujitsu Scientific and Technical Journal, Japan, vol. 26, No. 3, Oct. 1990, pp. 197–206, K. Fukuda et al., "Hypermedia Personal Computer Communication System: Fujitsu Habitat".

Proceedings: Virtrual Reality Annual International Symposium, Seattle, WA, Sep. 18–22, 1993, IEEE C. Soc. Press, USA, pp. 394–400, C. Carlsson et al., "Dive—A Multi–User Virtual Reality System".

Proceedings: Virtual Reality Annual International Symposium, Research Triangle Park, NC, Mar. 11–15, 1995, IEEE C. Soc. Press, USA, pp. 11–18, Q. Wang et al, "EM—AN Environment Manager for Building Networked Virtual Environments".

Proceedings: Advances in Parallel and Distributed Simulation, Anaheim, CA, Jan. 23–25, 1991, vol. 23, No. 1, SCS, USA, pp. 104–111, C. Kanarick, "A Technical Overview and History of the Simnet Project".

M. Pesce, "VRML–Browsing and Building Cyberspace," New Riders Publishing, Copyright 1995, pp. 43–81.

K. Matsuda et al, "Sony's Enhanced VRML Browser (Beta Version4B) –Cyber Passage Browser Manual," Software Library, Architecture Laboratories, Sony Corporation, Sony Computer Science Laboratory, (date text was written is and/or published is unknown), pp. 1–2, 1–13.

Material Collected from the World Wide Web on Jun. 16, 1996: K. Matsuda et al, "Sony's Approach to Behavior and Scripting Aspects of VRML: and Object–Oriented Perspective," Sony Computer Sciences Laboratory Inc. with Central Research Center, Sony Corp., (date text was written and/or published is unknown). pp. 1–6.

C. Morningstar et al, "The Lessons of Lucasfilm's Habitat," First Steps, Michael Benedikt (ED.), 1990, Mit Press, Cambridge, Mass., Address IS: file///c/my documents/lesson.html, pp. 1–13.

Materials Collected from the World Wide Web on Jun. 23, 1996, (date text was written and/or published is unknown), Pages Include: http://www.communities.com/habitat.html, pp. 1–2; file:///c/my documents/descent.gif, pp. 1; http://www.race.u–tokyo.ac.jp/race/tgm/mud/habitat.html, pp. 1–2; http://www.netusa.net/shadow/habitat/habitat.html, pp. 1–2.

Materials Collected from the World Wide Web on Jun. 21, 1996, (date the text was written and/or published is unknown), pages include: http://vs.sony.co.jp/vs–e/vs–top.html, pp. 1–2; http://vs.sony.co.jp/vs–e/works/browser/what.html, pp. 1–2; http://vs.sony.co.jp/vs–e/works/server/what.html, pp. 1–2; http://vs.sony.co.jp/vs–e/info/techinfo.html, pp. 1–3; http://vs.sony.co.jp/vs–e/info/faq/, pp. 1–5.

Proceedings 1992 Symposium on Interactive 3D Graphics, Mar. 29, 1992—Apr. 1, 1992, New York, US, pp. 147–156, M. Zyda et al., "NPSNET: Constructing a 3D Virtual World".

Proceedings of the Inet/Jencs, Jun. 15–17, 1994, Reston, VA, US, pp. 242/1–242/3, D. Raggett, "Extending WWW to Support Platform Independent Virtual Reality".

Communicating with Virtual Worlds, Proceedings of Computer Graphics International, Jun. 21–25, 1993, Tokyo, JP, pp. 41–49, M. Gigante et al., "Distributed, Multi–Person, Physically–Based Interaction in Virtual Worlds".

CYBERSPACE SYSTEM http ://www. csl. sony. co. jp / index. html

PROTOCOL TYPE / HOST NAME / FILE NAME

TO NETWORK 15

12

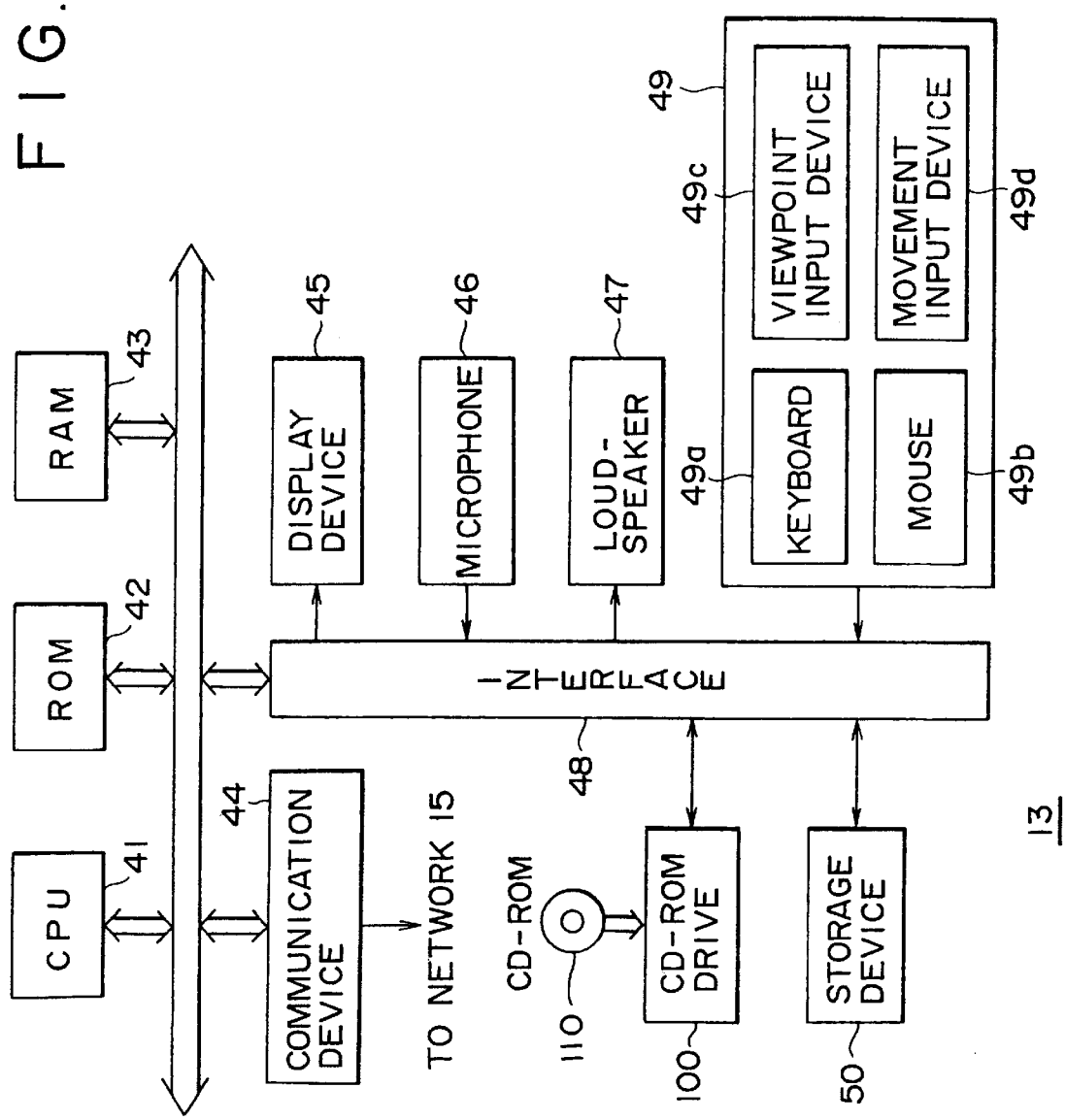

FIG. 16

| CASE | BASIC OBJECT DATA STORED IN : | URL OF UPDATE OBJECT DATA STORED IN : | UPDATE OBJECT DATA STORED IN : |
|---|---|---|---|
| 1 | VRML FILE OF SPECIFIC DIRECTORY IN STORAGE DEVICE OF INFORMATION SERVER | DEFAULT URL | INFORMATION SERVER |
| 2 | | MAPPING SERVER | SHARED SERVER IN JAPAN |
| 3 | | | SHARED SERVER IN US |
| 4 | VRML FILE OF SPECIFIC DIRECTORY IN STORAGE DEVICE OF CLIENT TERMINAL | MANUALLY SPECIFY URL | SPECIFIED SHARED SERVER |
| 5 | | MAPPING SERVER | SHARED SERVER IN JAPAN |
| 6 | | | SHARED SERVER IN US |
| 7 | VRML FILE OF SPECIFIC DIRECTORY OF CD-ROM OF CLIENT TERMINAL | MANUALLY SPECIFY URL | SPECIFIED SHARED SERVER |
| 8 | | MAPPING SERVER | SHARED SERVER IN JAPAN |
| 9 | | | SHARED SERVER IN US |

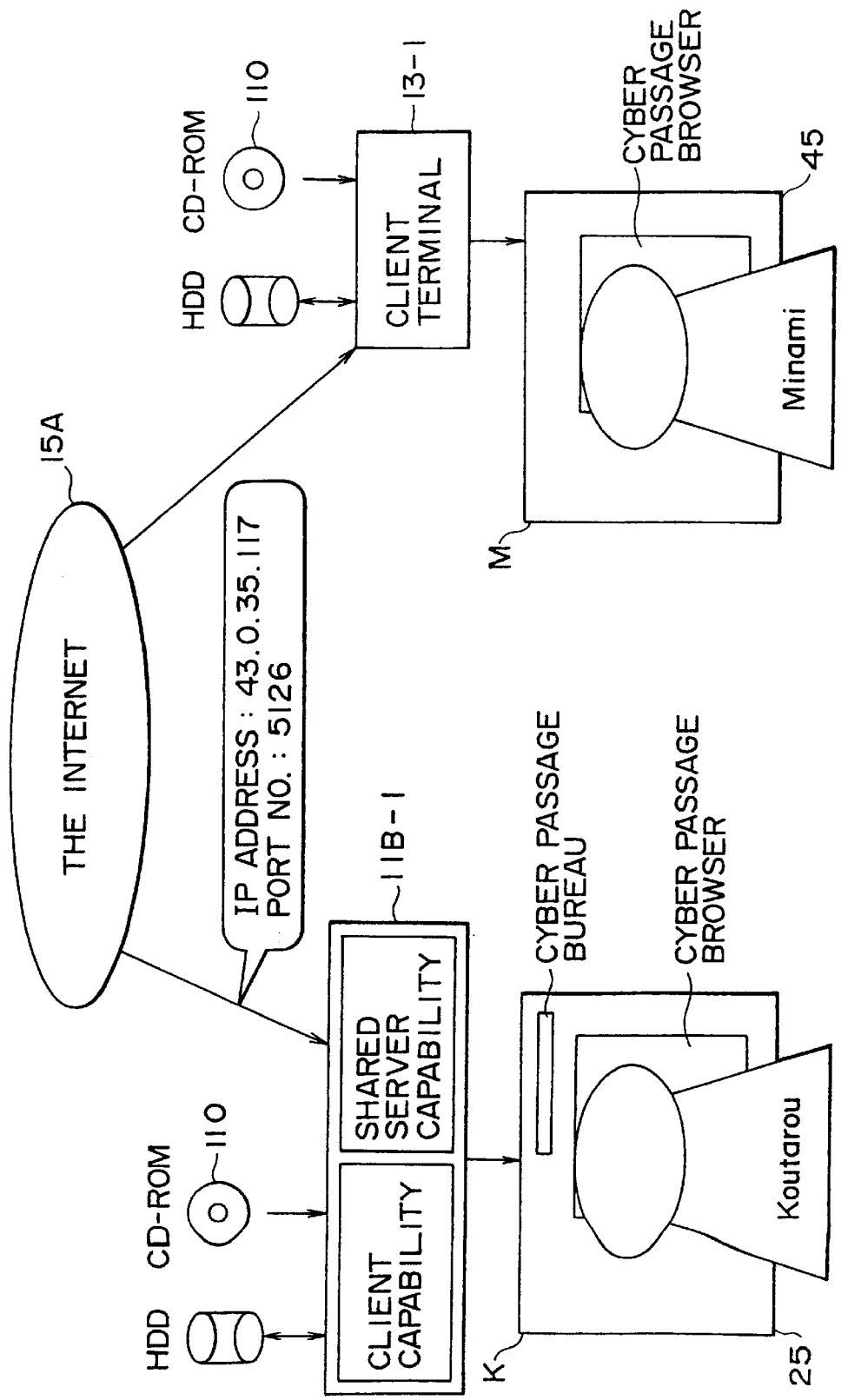

FIG. 20

| | MINIMUM OPERATING ENVIRONMENT | RECOMMENDED OPERATING ENVIRONMENT |
|---|---|---|
| HARDWARE | PC ON WHICH WINDOWS 95/NT OPERATE | ← |
| CPU | 486D × 2, 66MHz | PENTIUM 75MHz OR HIGHER |
| MEMORY | 12MB | 32MB OR HIGHER |
| DISK FREE SPACE | 3MB (9MB AT INSTALLATION) OR HIGHER | ← |
| RESOLUTION | 640 × 480 PIXELS | 800 × 600 PIXELS OR HIGHER |
| DISPLAY COLORS | 256 COLORS | 65536 COLORS OR HIGHER |
| SOFTWARE | NETSCAPE NAVIGATOR FOR WINDOWS (VER 2.0 OR LATER) | ← |
| SOUND | | SOUND BOARD |

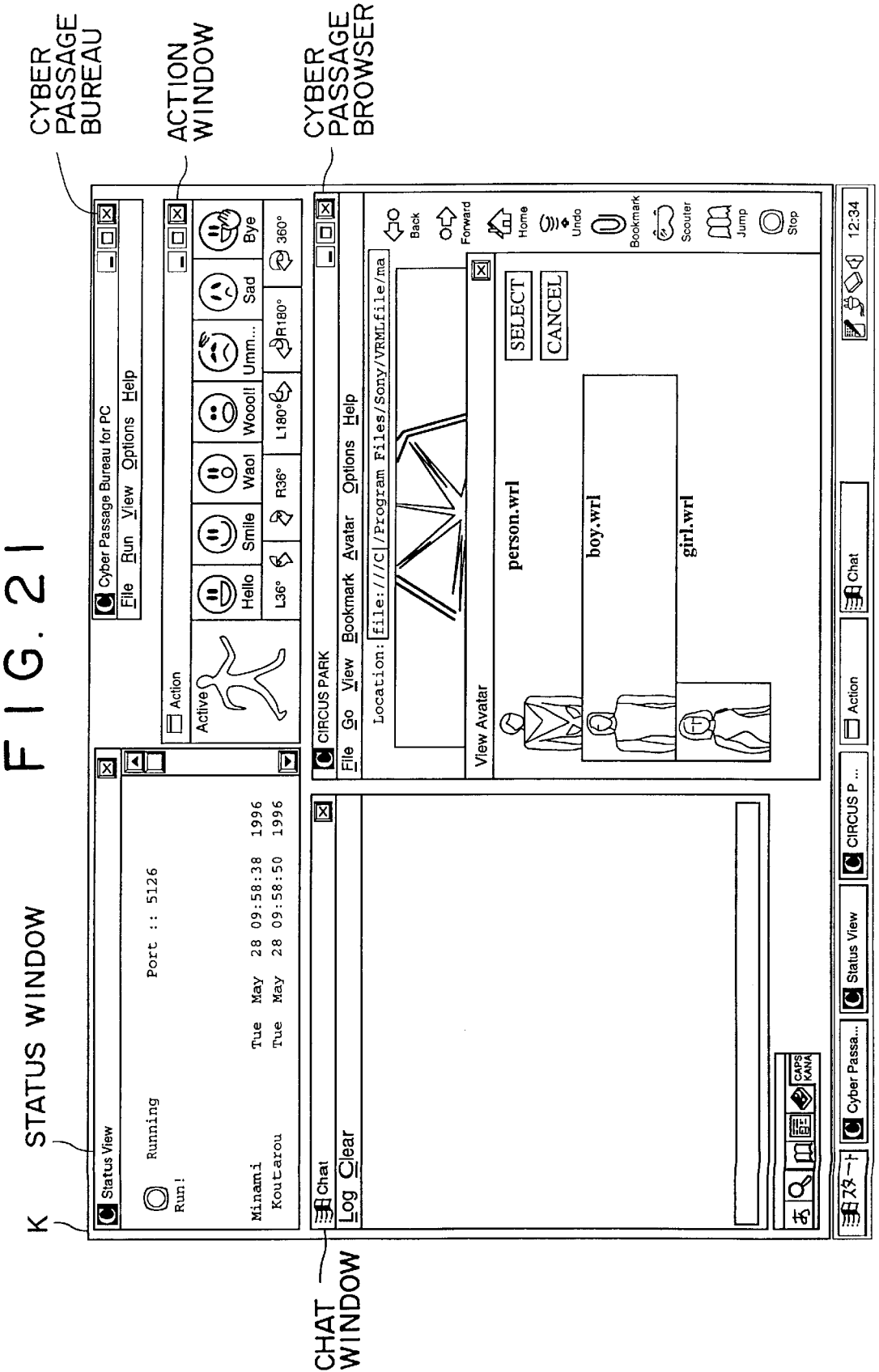

THREE-DIMENSIONAL VIRTUAL REALITY SPACE SHARING METHOD AND SYSTEM USING LOCAL AND GLOBAL OBJECT IDENTIFICATION CODES

BACKGROUND OF THE INVENTION

The present invention relates to a method and system of sharing a three-dimensional virtual reality space. The present invention further relates to a method of information processing, an information recording medium, a method of information recording, an information transmission medium, a method of information transmission, and a shared server terminal. More particularly, the present invention relates a shared server terminal suitably for use in a cyberspace system to be provided to unspecified users.

A cyberspace service named Habitat (trademark) is known in personal computer communications services, such as NIFTY-Serve (trademark) of Japan and CompuServe (trademark) of the US. In the Habitat service, a plurality of users connect their personal computers via modems and the public telephone network to host computers installed at the centers of the services to access them in predetermined protocols. Development of Habitat was started in 1985 by LucasFilm of the US, operated by QuantumLink, one of the US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) into a virtual city called Populopolis, drawn by two-dimensional graphics, to have a chat with each other. A chat is a realtime conversation based on text entered and displayed. For further details of Habitat, refer to "Cyberspace: First Steps," Michael Benedikt, ed., 1991, MIT Press Cambridge, Mass., ISBN0-262-02327-X, the translation being published Mar. 20, 1994, by NTT Publishing, ISBN4-87188-265-9C0010, pp. 282–307.

In the related art, cyberspace systems operated on such communications services as mentioned above, a virtual street, a virtual room interior, and the like are drawn in two-dimensional graphics. In such an environment, behavior of an avatar backward or forward is realized simply by moving it up or down in a two-dimensional background, providing poor representation for enabling the user to experience walking or behavior in the virtual space. Because this scheme makes the user look at the virtual space in which the user's avatar and another user's avatar are shown from the viewpoint of a third person, the sense of a realistic pseudo experience is marred to a large extent. Therefore, realization of realistic walk-through capability has been awaited by the industry concerned, in which the virtual space is displayed in three-dimensional graphics and an avatar can walk freely in the virtual space from the viewpoint of avatar itself, thus enhancing the realism of the pseudo experience.

On the other hand, for a related art example for realizing the sharing of a three-dimensional virtual reality space on a network, a system as shown in FIG. 29 is known in which terminals are interconnected by the LAN (Local Area Network) installed in companies or laboratories. In this example, three client terminals 213-1 through 213-3 are connected to a server terminal 211-1 via a LAN. The server terminal 211-1 is constituted to output image data of a virtual reality space to each of the client terminals 213-1 through 213-3 to display the virtual reality space thereon.

In the above-mentioned example, a cylindrical object 201, a quadrangular prism object 202, and a conical object 203 are displayed on a display device of each of the client terminals 213-1 through 213-3. The server terminal 211-1 controls the cylindrical object 201, the quadrangular prism object 202, and the conical object 203 using object identification codes (IDs) obj201, obj202, and obj203 respectively.

For example, if a command is given from an input device of the client terminal 213-1 to move the cylindrical object 201 displayed on the same to a specific position, the client terminal 213-1 outputs a request to the server terminal 211-1 for moving the object ID obj201 assigned thereto. Receiving this request, the server terminal 211-1 outputs a request to the other client terminals 213-2 and 213-3 for moving the object ID obj201. Positional data (move data) entered in the client terminal 213-1 are supplied to the client terminals 213-2 and 213-3 through the server terminal 211-1.

The client terminal 213-1 generates image data for moving the cylindrical object 201 (the object ID obj201) to the specified position according to the operation made on its input device and displays the generated image data on its display device. The other client terminals 213-2 and 213-3 also generate the image data for moving the cylindrical object 201 of the same object ID obj201 to display the generated image data on their respective display devices.

Each of the above-mentioned objects 201 through 203 and an object representing an avatar, or an alter ego of a user, can move around in a virtual reality space, enter it, and exit from it. In other words, these objects change (update) their states in the virtual reality space. So, each of these objects is called an update object as appropriate hereinafter. On the other hand, an object representative of a building constituting a town in the virtual reality space is used commonly by a plurality of users and does not change in its basic state. Even if the building object changes, it changes autonomously, namely it changes independent of the operations made at client terminals. Such an object commonly used by a plurality of users is called a basic object as appropriately hereinafter.

In the related art system, the object IDs controlled by the server terminal 211-1 are commonly used by the client terminals 213-1 through 213-3 connected to the server terminal 211-1. Namely, these object IDs functions as global IDs (global identification codes).

Therefore, in the client terminal 213-1 for example, if a new object is generated and a request for increasing the number of object IDs (global IDs) is supplied to the server terminal 211-1, the server terminal 211-1 checks whether the same object ID is already used in the other client terminals 213-2 and 213-3. If this new object ID is not used on these client terminals, the server terminal allows these client terminal to use this new object ID.

If the cylindrical object 201 is no longer necessary on the client terminal 213-1, for example, and therefore its object ID obj201 is used for another object, a message is sent from the client terminal 213-1 to the server terminal 211-1 asking for deletion of the obj201. Receiving the message, the server terminal 211-1 outputs a request for the deletion of obj201 to the other client terminals 213-2 and 213-3. Receiving this deletion message, the client terminals 213-2 and 213-3 output a signal of permitting the deletion if the object ID obj201 is not used on these client terminals.

When the deletion permitting signal comes from both the client terminals 213-2 and 213-3, the server terminal 211-1 instructs the client terminals 213-1 through 213-3 to delete that object ID. Each client terminal actually deletes that ID as instructed.

As described above, each client terminal cannot freely perform such operations as reassignment (reuse) of an object ID previously used for a specific object to another object by deleting the former object. Therefore, it is required for each client terminal to allocate a number of object IDs which is greater than actually necessary for each client terminal.

On the other hand, although the above-mentioned inconvenience is involved, in a closed system built through the LAN as shown in FIG. 29, is not used by unspecified users outside the company or laboratory in which the system is installed, and all client terminals 213-1 through 213-3 are always connected to the server terminal 211-1, so that the allocation of object IDs can be determined in a centralized manner, namely the system can be controlled by the global IDs alone.

However, for a system in which unspecified users connect to a server terminal via a communication network at any time to share a three-dimensional virtual reality space, all client terminals are not always connected to the server terminal. For this reason, it is extremely difficult to transfer messages with all client terminals for addition and deletion of object IDs according to the needs for the addition and deletion of object IDs on each client terminal.

SUMMARY OF THE INVENTION

It is therefore an object of the present invention to provide a method and system of sharing three-dimensional virtual reality space. It is an object of the present invention to provide an information recording medium, a method of information recording, an information transmission medium, a method of information transmission, It is a further object of the present invention to provide a shared server terminal that allows the object identification codes to be dynamically controlled so that if customizations by users as addition and deletion of objects are performed, each of the client terminals controls only the minimum necessary number of object identification codes. In this way, a three-dimensional virtual reality space can be applied to a system shared by unspecified users.

In carrying out the invention and according to one aspect thereof, there is provided a method of sharing a three-dimensional virtual reality space. The method of sharing includes the step of connecting a plurality of client terminals, for displaying a three-dimensional virtual reality space, including a plurality of objects to a shared server terminal. The shared server terminal controls the states of the plurality of objects via a communication network.

The method further includes the step of setting a local identification code unique to each of the plurality of objects on each of the plurality of client terminals. The method further includes the step of controlling the states of the plurality of objects in the plurality of client terminals by converting on the shared server terminal the local identification code to be transferred with each of the plurality of client terminals into a global identification code by use of a conversion table registered in the shared server terminal in advance.

According to the present invention, a local identification code corresponding to an object is separately set on each client terminal. On the shared server terminal, the local identification code is converted to a global identification code by means of a conversion table previously registered in the shared server terminal. Further, a conversion table indicating the relationship between a local identification code corresponding to each object set separately to each client terminal and a global identification code controlled by the shared server terminal is stored in the shared server terminal. A local identification code of an object specified by a specific client terminal is converted to a global identification code by the conversion table to control the state of each object.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 15 is a block diagram illustrating another example of the constitution of the client terminal 13;

FIG. 16 is a table describing locations in which basic objects and update objects are stored;

FIG. 19 is a diagram describing the software of the client terminal 13-1 and the shared server terminal 11B-1;

FIG. 20 is a table describing an environment in which the software operates;

FIG. 21 is a diagram illustrating an example of display on the shared server terminal 11B-1 of FIG. 19;

DETAILED DESCRIPTION OF PREFERRED EMBODIMENTS

Figure 1:
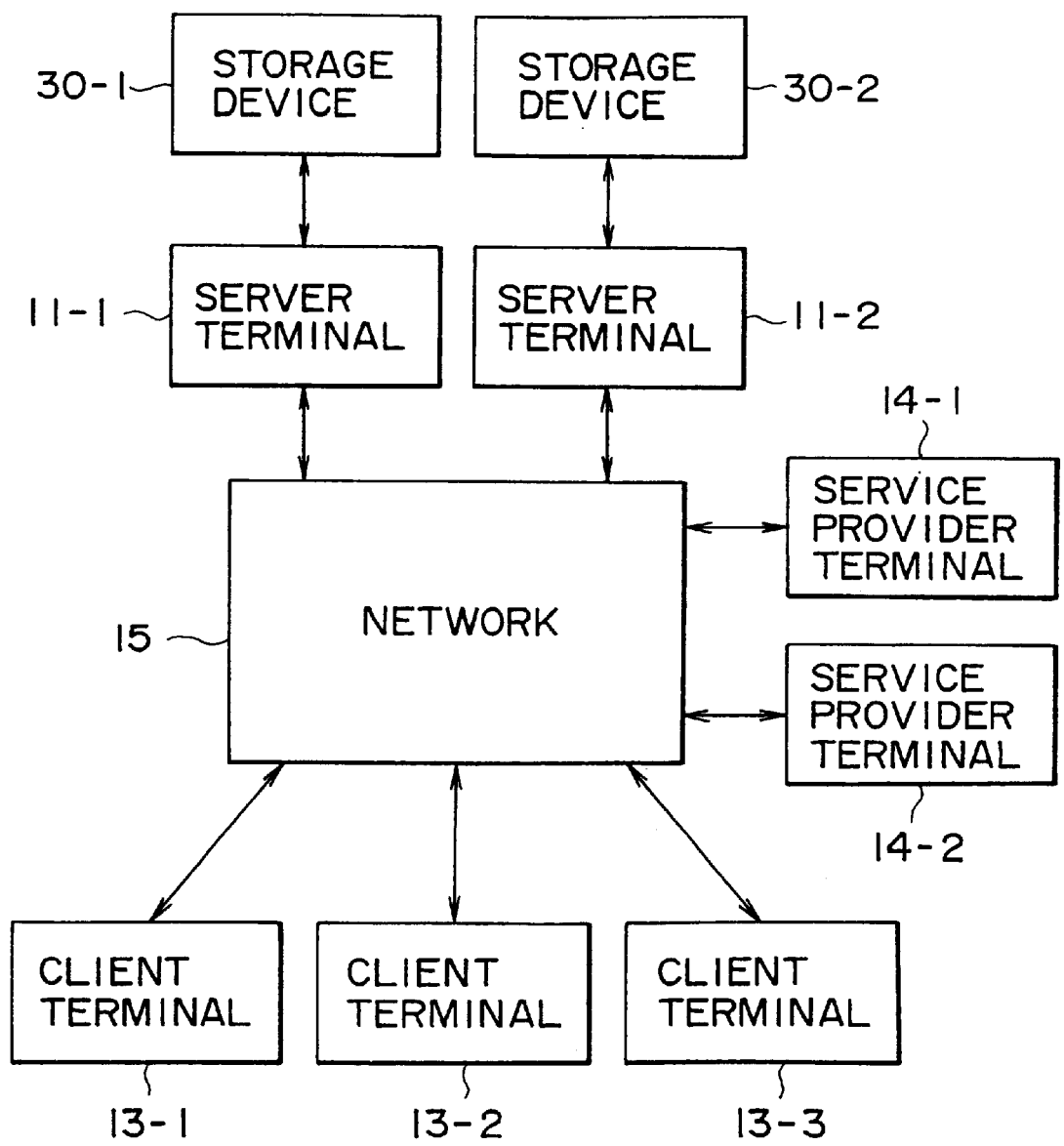
FIG. 1 is a block diagram illustrating an example of the constitution of a cyberspace system associated with the invention.

This invention will be described in further detail by way of example with reference to the accompanying drawings.

The basic idea and concept of a virtual society is described by Hiroaki Kitano, Sony Computer Science Laboratories, as follows in his home page "Kitano Virtual Society (V1.0)" (the URL is http://www.csl.sony.co.jp/person/kitano/VS/concept.j.html.1995):

"In the beginning of the 21st century, a virtual society would emerge in a network spanning all the world. People in every part of the world will make a society in which millions or hundred millions of people live in a shared space created in the network. A society that will emerge beyond the current Internet, CATV, and the so-called information super highway is a virtual society that I conceive. In the virtual society, people can not only perform generally the same social activities as those in the real world—enjoy shopping, have a chat, play games, do work, and the like—but also perform things that are possible only in the virtual society (for example, moving from Tokyo to Paris in an instant). Such a "society" would be implemented only by state-of-the-art technologies such as cyberspace constructing technologies that support a broadband network, high-quality three-dimensional presentation capability and bidirectional communications of voice, music and moving picture signals, and a large-scale distributed system that allows a lot of people to share the constructed space."

For further details, look at the above-mentioned home page (URL http://www.csl.sony.co.jp/person/kitano/VS/concept.j.html).

The three-dimensional virtual reality space that implements the above-mentioned virtual society is a cyberspace system. The actual examples of the infrastructures for constructing this cyberspace system include, at this point in time, the Internet, which is a world-wide computer network connected by a communications protocol called TCP/IP (Transmission Control Protocol/Internet Protocol) and the intranet implemented by applying the Internet technologies such as the WWW (World Wide Web) to the in-house LAN (Local Area Network). Further, the use of a broadband communication network based on FTTH (Fiber To The Home) in the future is proposed in which the main line system and the subscriber system are all constituted by fiber optics.

Meanwhile, for an information providing system available on the Internet, the WWW developed by CERN (European Center for Nuclear Research) in Switzerland is known. This technology allows a user to browse information including text, image and voice, for example, in the hyper text form. Based on HTTP (Hyper Text Transfer Protocol), the information stored in a WWW server terminal is sent asynchronously to terminals such as personal computers.

The WWW server is constituted by server software called an HTTP demon and an HTML file in which hyper text information is stored. The hyper text information is described in a description language called HTML (Hyper Text Makeup Language). In the description of a hyper text by HTML, a logical structure of a document is expressed in a format specification called a tag enclosed by "<" and ">". Description of linking to other information is made based in link information called an anchor. A method in which a location at which required information is stored by the anchor is URL (Uniform Resource Locator).

A protocol for transferring a file described in HTML on the TCP/IP network is HTTP. This protocol has a capability of transferring a request for information from a client to the WWW server and the requested hyper text information stored in the HTML file to the client.

Used by many as an environment for using the WWW is client software such as Netscape Navigator (trademark) called a WWW browser.

It should be noted that demon denotes a program for executing control and processing in the background when performing a job in the UNIX environment.

Recently, a language for describing three-dimensional graphics data, called VRML (Virtual Reality Modeling Language) and a VRML viewer for drawing a virtual reality space described in this VRML on a personal computer or on a workstation have been developed. VRML allows one to extend the WWW, set hyper text links to objects drawn by three-dimensional graphics, and follow these links to sequentially access WWW server terminals. The specifications of VRML version 1.0 were made public in May 26, 1995. Then, in Nov. 9, 1995, a revised version, in which errors and ambiguous expressions were corrected, was made public. The specifications are available from URL=http://www.oki.com./vrml/vrml10c.html.

Storing three-dimensional information described in the above-mentioned VRML in a WWW server terminal allows the construction of a virtual space expressed in three-dimensional graphics on the Internet. Further, use of the VRML viewer by using personal computers and the like interconnected by the Internet can implement the display of a virtual space based on three-dimensional graphics and the walk-through capability.

In what follows, examples in which the Internet is used for a network will be described. It will be apparent to those skilled in the art that FTTH may be used instead of the Internet to implement the virtual space.

It should be noted that Cyberspace is a coinage by William Gibson, a US science fiction writer, and was used in his novel "Neuromancer" (1984) that made him famous. Strictly speaking, however, the word Cyberspace first appeared in his novel "Burning Chrome" (1982). In these novels, there are scenes in which the hero attaches a special electrode on his forehead to connect himself to a computer to directly reflect on his brain a virtual three-dimensional space obtained by visually reconfiguring data on a computer network spanning all over the world. This virtual three-dimensional space was called Cyberspace. Recently, the term has come to be used as denoting a system in which a virtual three-dimensional space is used by a plurality of users via a network.

Now, referring to FIG. 1, there is shown an example of the constitution of a cyberspace system practiced as one preferred embodiment of the present invention. As shown, a given number (in this case, two) of shared server terminals 11-1 and 11-2 have storage devices 30-1 and 30-2 respectively and are adapted to provide a virtual reality space via a network 15 (a global communication network) represented by the Internet for example. In addition, a given number (in this case, three) of client terminals 13-1 through 13-3 are installed to receive the virtual reality space and specific services (information) using the same from the shared server terminals 11-1 and 11-2 via the network 15.

Further, in the above-mentioned embodiment, a given number (in this case, two) of service provider terminals 14-1 and 14-2 are installed to receive the virtual reality space from the shared server terminals 11-1 and 11-2 via the network 15 and provide specific services to the client terminals 13-1 through 13-3.

Figure 2:
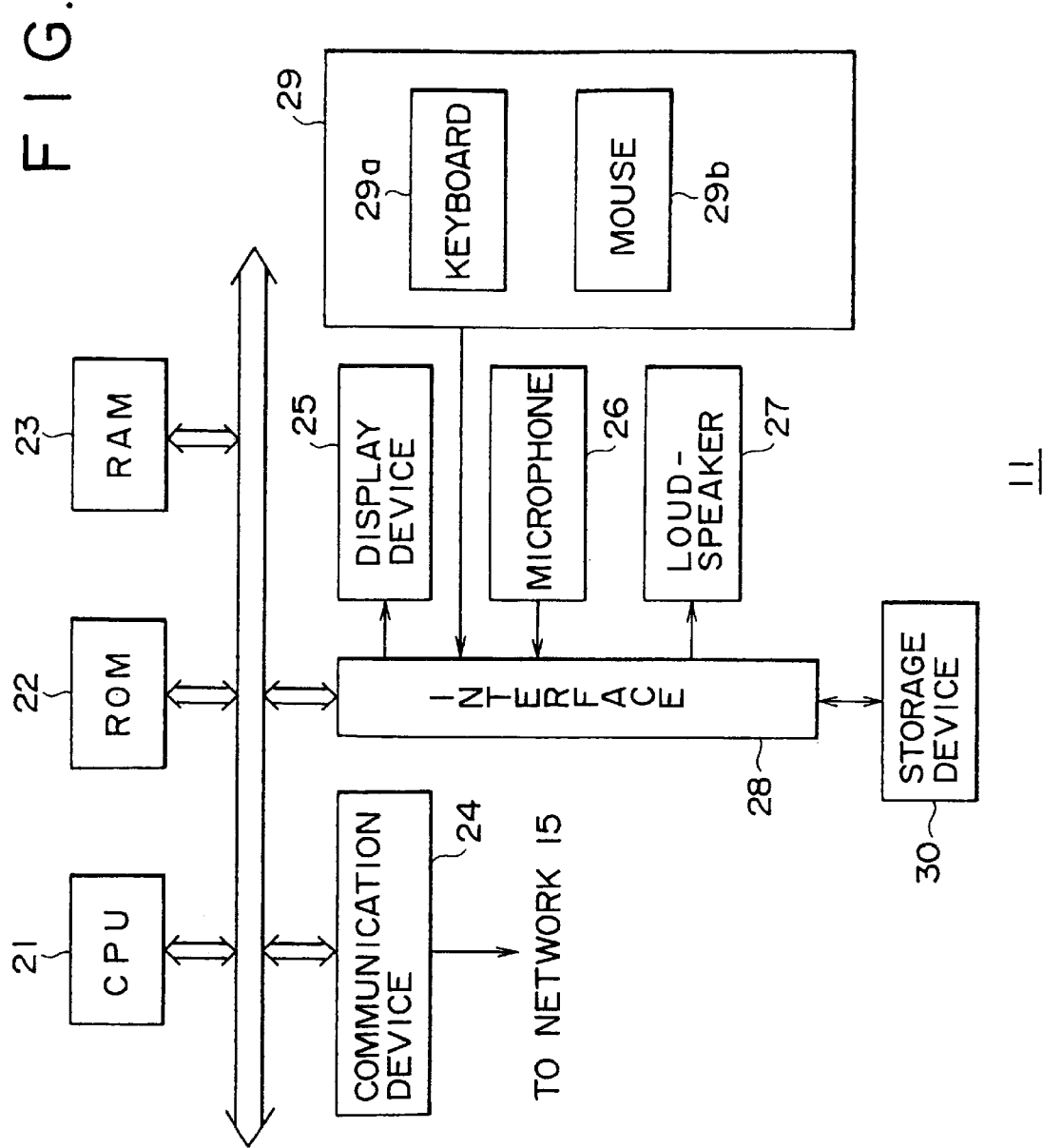
FIG. 2 is a block diagram illustrating an example of the constitution of a server terminal 11 of FIG. 1.

FIG. 2 shows an example of the constitution of the shared server terminal 11 (namely, 11-1 and 11-2). As shown, the shared server terminal 11 has a CPU 21. The CPU 21 executes a variety of processing operations as instructed by a program stored in a ROM 22. A RAM 23 appropriately stores data and a program necessary for the CPU 21 to execute the variety of processing operations. A communication device 24 (communication means) transfers specific data with the network 15 (the Internet).

A display device 25 has a CRT (Cathode Ray Tube) or an LCD (Liquid Crystal Display) for example and is connected to interface 28 to monitor images of the virtual reality space provided by the shared server terminal 11. The interface 28 is also connected with a microphone 26 and a speaker 27 to supply a specific voice signal to the client terminal 13 and the service provider terminal 14 and monitor a voice signal coming from these terminals.

The shared server terminal 11 has an input device 29 on which a variety of input operations are performed via the interface 28. This input device has at least a keyboard 29a and a mouse 29b.

Figure 3:
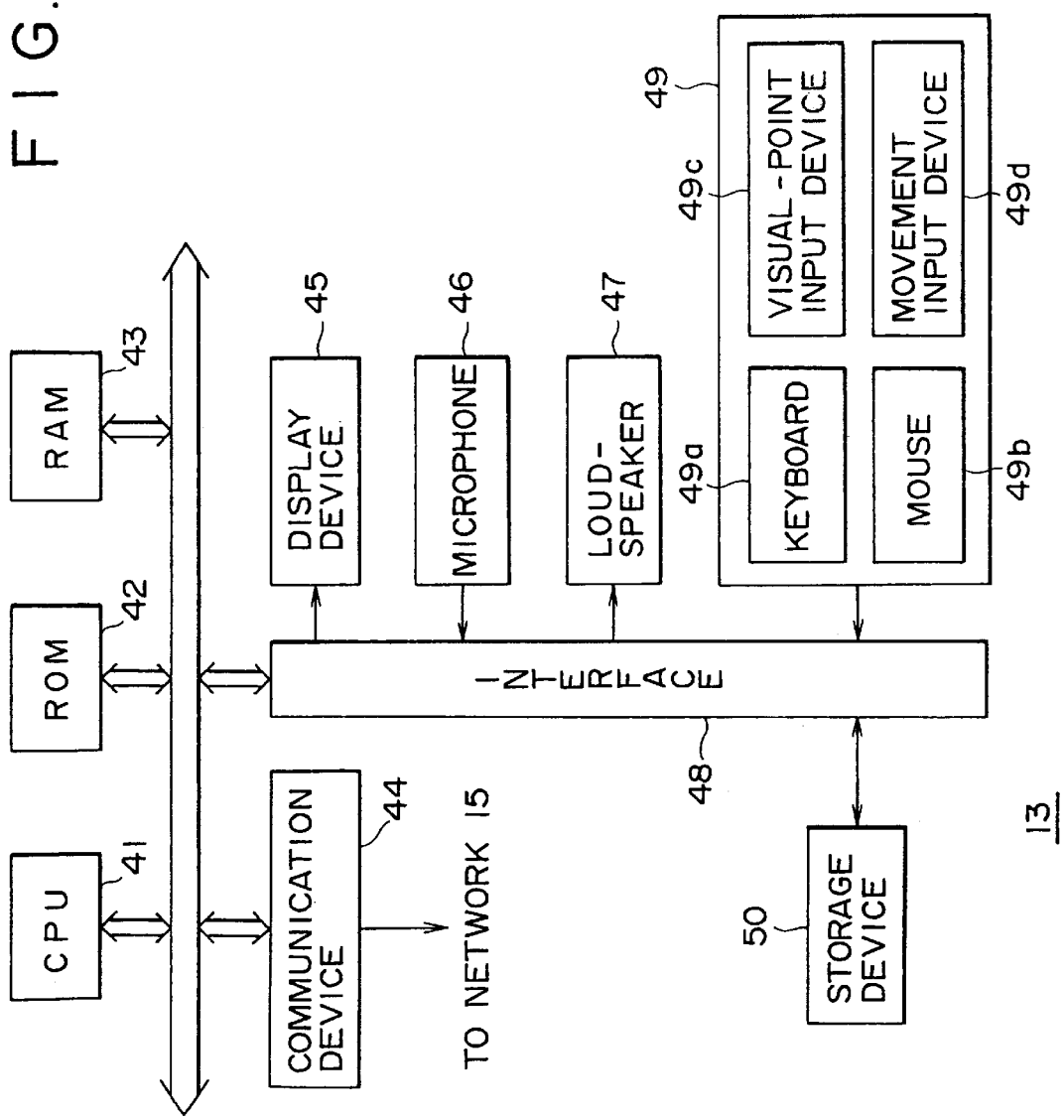
FIG. 3 is a block diagram illustrating an example of the constitution of a client terminal 13 of FIG. 1.

FIG. 3 shows an example of the constitution of the client terminal 13 (namely, 13-1 through 13-3). The client terminal 13 has a CPU 41 which executes a variety of processing operations according to a program stored in a ROM 42. A RAM 43 appropriately stores data and a program necessary for the CPU 41 to executes the variety of processing operations. A communication device 44 transfers data to the shared server terminal 11 via the network 15 (the Internet).

A display device 45 has a CRT or an LCD to display three-dimensional images created by computer graphics (CG) or taken by an ordinary video camera. A microphone 46 is used to output a voice signal to the shared server terminal 11. A speaker 47 outputs the voice signal coming from the shared server terminal 11. An input device 49 is operated to perform a variety of input operations.

A keyboard 49a of the input device 49 is operated when entering specific characters and symbols. A mouse 49b is operated when entering specific positional information. A viewpoint input device 49c is operated when changing the state of the avatar (object) as an update object of the client terminal 13. That is, the viewpoint input device 49c is used to enter the viewpoint of the avatar of the client terminal 13, thereby moving the viewpoint of the avatar vertically, horizontally or in the depth direction and zooming a specific image. In addition, a behavior input device 49d is used to move the avatar in the forward and backward direction or the right and left direction at a specific speed. It is apparent that the operations done through the viewpoint and behavior input devices may also be done through the above-mentioned keyboard 49a and the mouse 49b.

Interface 48 constitutes the data interface with a display device 45, a microphone 46, a speaker 47, and an input device 49. A storage device 50 composed of a hard disc, an optical disc, and magneto-optical disc stores data and programs.

Figure 4:
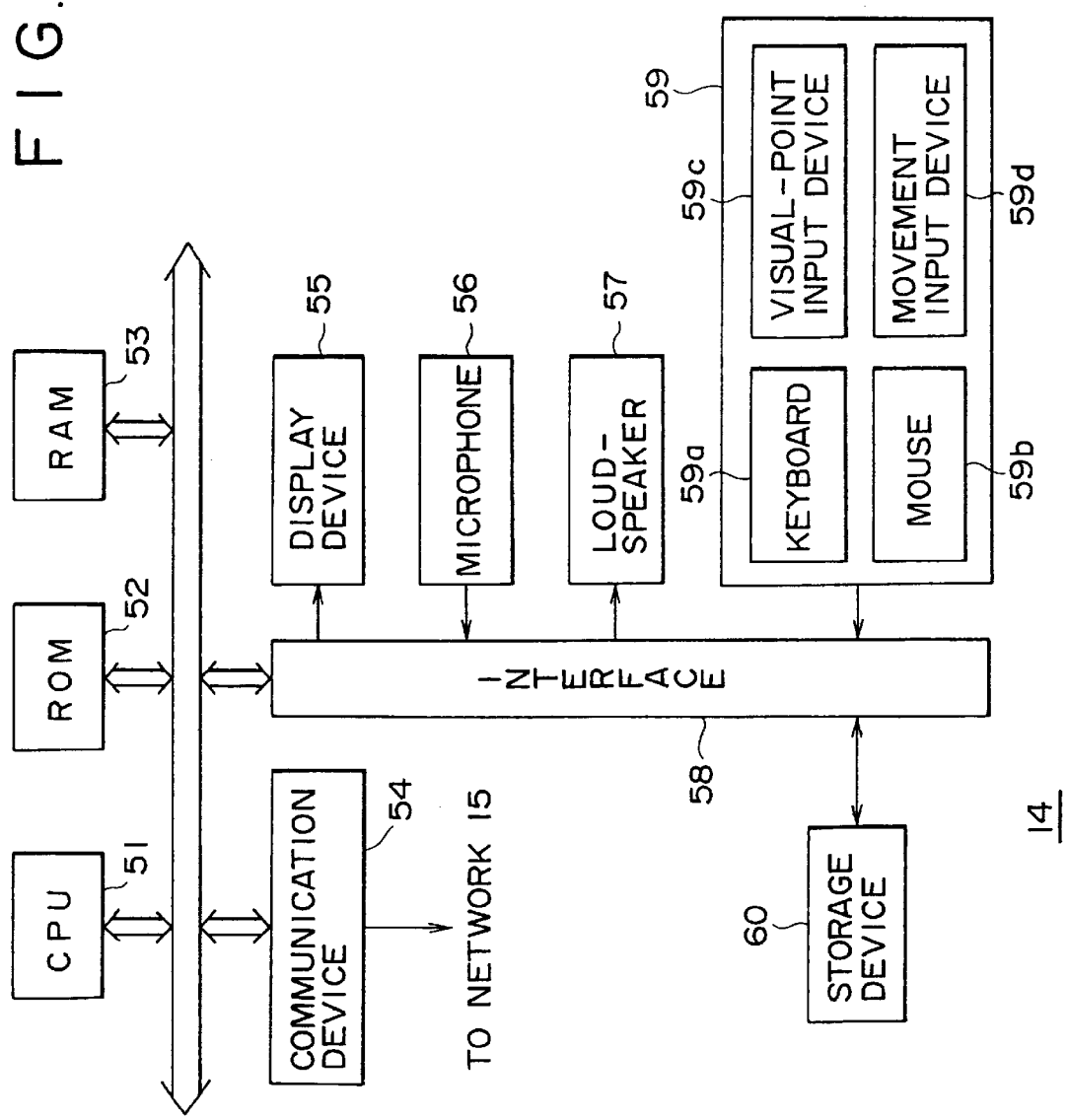
FIG. 4 is a block diagram illustrating an example of the constitution of an information server terminal 14 of FIG. 1.

FIG. 4 shows an example of the constitution of the service provider terminal 14 (namely, 14-1 and 14-2). The components include a CPU 51 and a storage device 60. The components are generally the same as the components of the client terminal described in connection with FIG. 3 and therefore the description of service provider terminal 14 is omitted.

Figure 5:
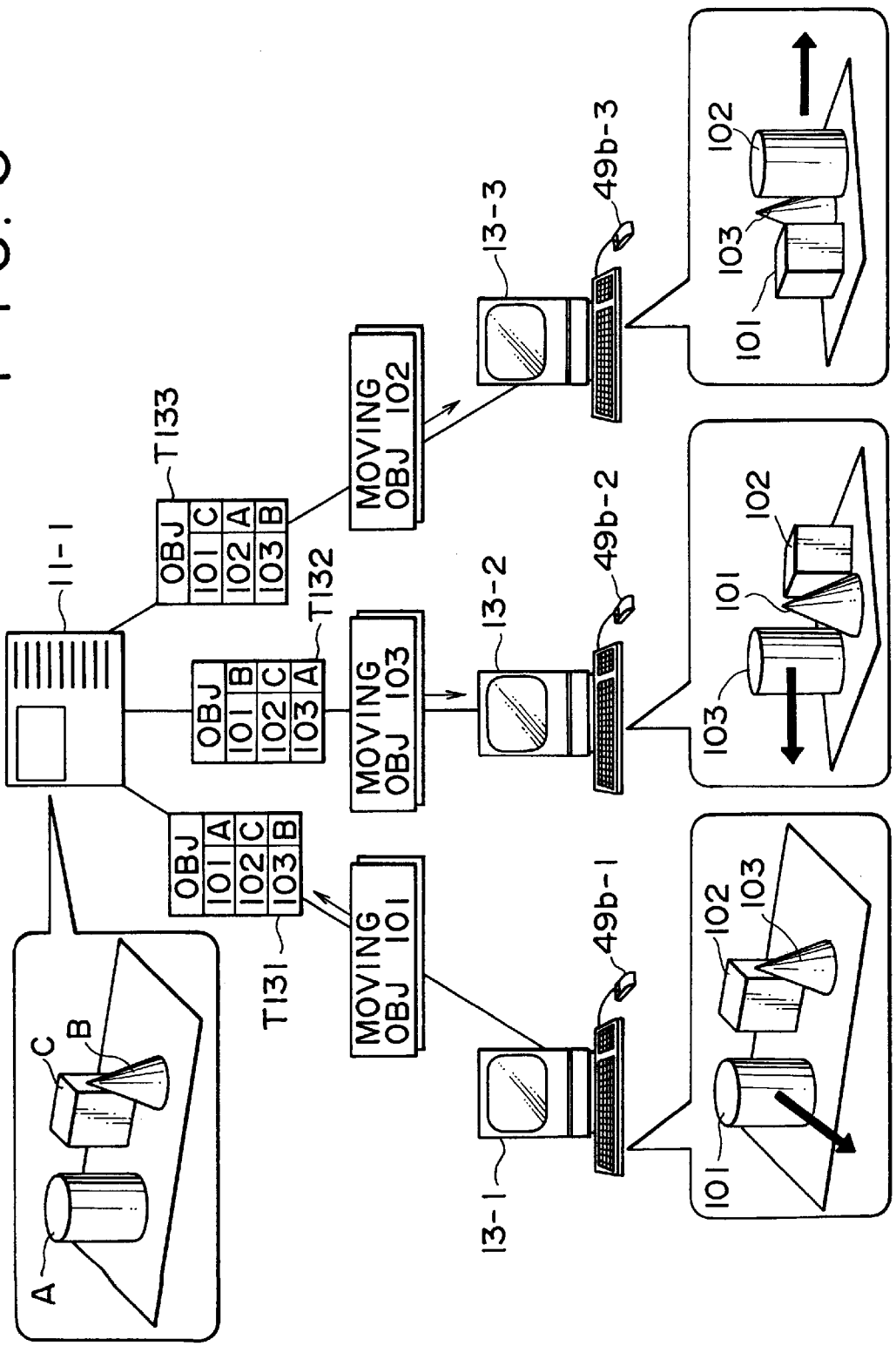
FIG. 5 is a diagram describing the control of objects.

In what follows, controlling of objects in this cyberspace system will be described with reference to FIG. 5 (in FIG. 5, the network 15 is not shown for convenience).

In this embodiment, each of the client terminals 13-1 through 13-3 controls the objects used in the virtual reality space independently of the other client terminals. It is assumed now that there is a cylindrical object A, a conical object B, and a quadrangular prism object C. These objects constitute the virtual reality space provided by the shared server terminal 11-1. The display device 45 of each of the client terminals 13-1 through 13-3 shows the objects 101 through 103 in the virtual reality space seen from the viewpoint of a corresponding avatar as shown in FIG. 5.

In this embodiment, the CPU 41 of the client terminal 13-1 controls the objects by relating the same with independently set local IDs. Namely, the CPU 41 controls the cylindrical object A as local ID obj101, the quadrangular prism object C as local ID obj102, and the conical object B as local ID obj103. The CPU 41 of the client terminal 13-2 controls the objects by relating the same with independently set local IDs. Namely, the CPU 41 controls the cylindrical object A as local ID obj103, the quadrangular prism object C as local ID obj102, and the conical object B as local ID obj101. The CPU 41 of the client terminal 13-3 controls the objects by relating the same with independently set local IDs. Namely, the CPU 41 controls the cylindrical object A as local ID obj102, the quadrangular prism object C as local ID obj101, and the conical object B as local ID obj103.

On the other hand, the shared server terminal 11-1 holds tables T131 through T133 (conversion tables) corresponding to the client terminals 13-1 through 13-3 respectively in the RAM 23 or the storage device 30. Each of the tables T131 through T133 lists in advance the relationship between the local IDs of the objects controlled by the corresponding client terminal and the global IDs of the objects controlled by the shared server terminal 11-1. These tables T131 through T133 may be stored in the storage device 30 of the shared server terminal 11-1 or in the client terminals 13-1 through 13-3 respectively to be uploaded from the client terminals 13-1 through 13-3 at the start of communication. In these tables T131 through T133, in the initial state or default state, the local IDs are set to the same values as those of the global IDs. When the input device (ID code setting means) 49 of each of the client terminals 13-1 through 13-3 is operated by the user, the local IDs different from the global IDs in value are set sequentially.

In the above-mentioned embodiment, the shared server terminal 11-1 controls the objects as follows: the global ID of the cylindrical object A as objA, the global ID of the conical object B as objB, and the global ID of the quadrangular prism object C as objC. As a result, the table T131 for controlling the client terminal 13-1 lists global IDs objA, objC, an objB for the local IDs obj101, obj102, and obj103 respectively. The table T132 for controlling the client terminal 13-2 lists the global IDs objB, objC, and objA for the local IDs obj101 through obj103. The table T133 for controlling the client terminal 13-3 lists the global IDs objC, objA, and objB for the local IDs obj101 through obj103.

For example, in the client terminal 13-1, when the cylindrical object 101 has been moved to a specific position by operating the mouse 49b, the CPU 41 of the client terminal 13-1 controls the communication device 44 to output the local ID obj101 and the positional data after the behavior (namely, update information) to the shared server terminal 11-1 via the network 15. The CPU 21 of the shared server terminal 11-1 references the table T131 to convert the local ID obj101 to the global ID objA.

Further, the CPU 21 of the shared server terminal 11-1 references the table T132 to convert the global ID objA to the local ID obj103 controlled by the client terminal 13-2. Then, the CPU 21 controls the communication device 24 to output this local ID obj103 to the client terminal 13-2 along with the positional data (update information). Receiving the data via the communication device 44, the CPU 41 of the client terminal 13-2 moves the cylindrical object 103 as specified by the supplied positional data because the local ID obj103 is allocated to the cylindrical object 103.

Likewise, the shared server terminal 11-1 references the table T133 to convert the global ID objA to the local ID obj102 of the client terminal 13-3, supplying this local ID obj102 and positional data to the client terminal 13-3. In the client terminal 13-3, its CPU 41 allocates the local ID obj102 to the cylindrical object 102. Consequently, in the client terminal 13-3, the cylindrical object 102 is moved as specified in the entered positional data.

Figure 6:
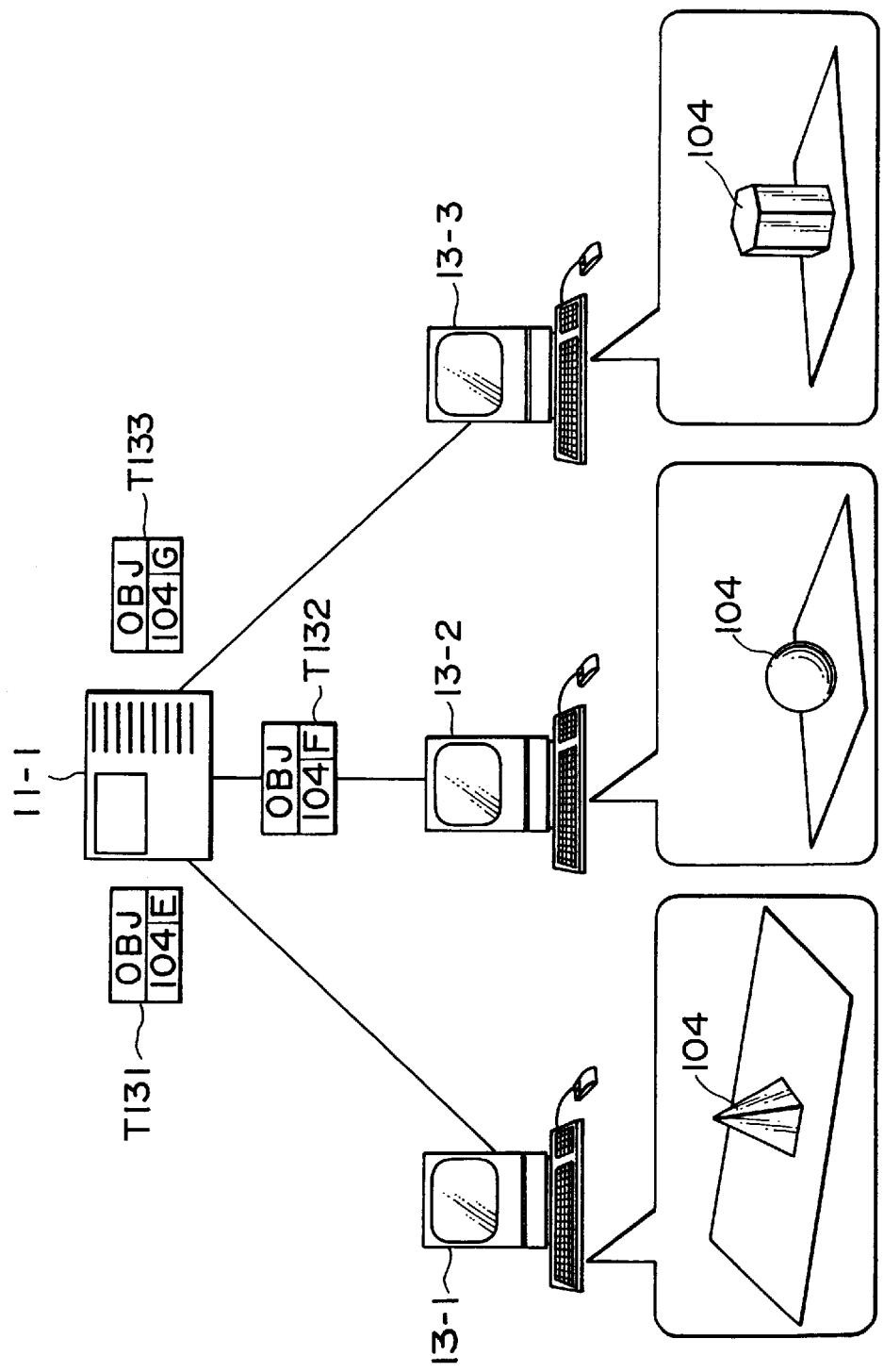
FIG. 6 is a another diagram describing the control of objects.

FIG. 6 shows another display example. In this embodiment, a quadrangular pyramid object 104 is allocated to the client terminal 13-1 as a local ID obj104. The client terminal 13-2 shows a spherical object 104 identified by a local ID obj104. The client terminal 13-3 shows a hexagonal prism object 104 identified by a local ID obj104.

At this moment, the shared server terminal 11-1 controls the quadrangular pyramid object 104, the spherical object 104 and the hexagonal prism object 104 as global IDs objE, objF, and objG. Hence, the table T131 holds the local ID obj104 and the global ID E, the table T132 holds the local ID obj104 and the global ID F, and the table T133 holds the local ID obj104 and the global ID G in related manner.

Namely, the shared server terminal 11-1 requires the number of global IDs corresponding to the number of objects existing in the system; however, each of the client terminals 13-1 through 13-3 may only hold the number of objects necessary at a specific time in local IDs. Therefore, as shown in FIG. 6, it is possible to allocate the same local ID to completely different objects such as the quadrangular pyramid object, spherical object, and hexagonal prism object. This denotes that each of the client terminals 13-1 through 13-3 can determine or delete local IDs independently. Consequently, each client terminal can reuse local ID's without restriction.

In the above-mentioned embodiment, update objects of which states such as positions are subject to change in the three-dimensional virtual reality space are represented by a cylinder, a quadrangular prism, a cone and the like. It will be apparent that the objects can take any figures such as an avatar resembling a user. In the above-mentioned embodiment, transfer of the positional data after behavior was shown for example as the object update information. It will be apparent that the update information may also include object behavior, rotation, and a change in color.

In what follows, a more specific example of the cyberspace system will be described.

Figure 7:
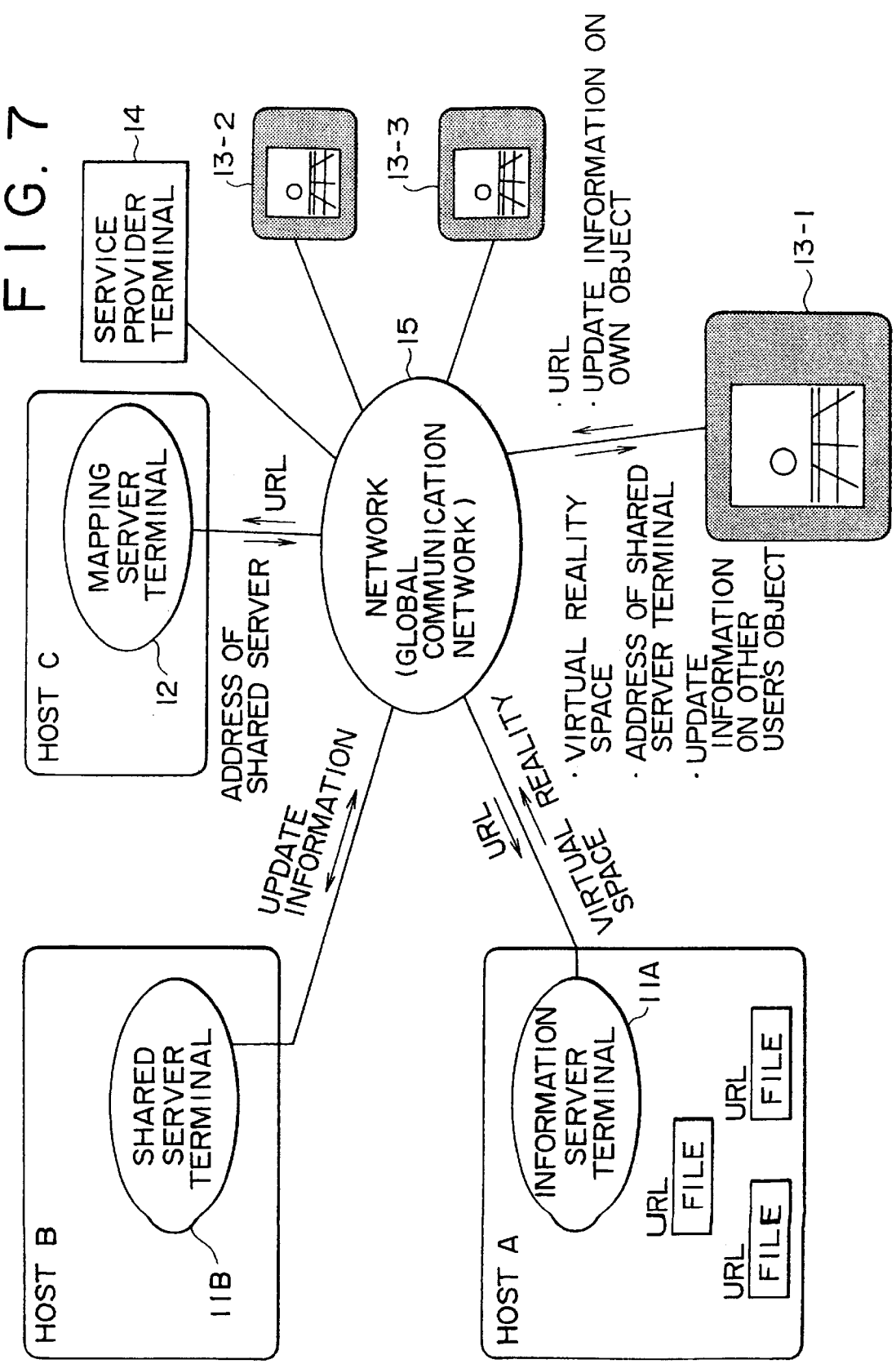
FIG. 7 is a block diagram illustrating an example of the constitution of a cyberspace system practiced as one preferred embodiment of the invention.

FIG. 7 shows an example of the constitution of the cyberspace system (namely, a three-dimensional virtual reality space provided via a network) according to the present invention. As shown in the figure, in this preferred embodiment, host computers (or simply hosts) A through C, a plurality (three in this embodiment) of client terminals 13-1 through 13-3, and any number (one in this embodiment) of service provider terminal 14 are interconnected via a world-wide network (communication network 15, namely an information transmission medium) such as the Internet.

Host A constitutes a system of the WWW (World Wide Web), for example. Namely, the host A has information (or a file) to be described later. And, each piece of information (or each file) is related with a URL (Uniform Resource Locator) to uniformly specify that information. Specifying a URL allows access to the information corresponding to it.

To be more specific, the host A stores three-dimensional image data for providing three-dimensional virtual reality spaces (hereinafter appropriately referred to simply as virtual reality spaces) such as virtual streets in Tokyo, New York, and other locations for example. It should be noted that these three-dimensional image data do not change in their basic state. That is, these data include static data consisting of only basic objects such as a building and a road to be shared by a plurality of users. If the basic state changes, it only reflects an autonomous change in the state of a merry-go-round or a neon light. The static data is considered to be data that is not subject to update. The host A has an information server terminal 11A (a basic server terminal) as one of the server terminals 11. The information server terminal 11A is adapted, when the same receives a URL via the network 15, to provide the information corresponding to the received URL, namely a corresponding virtual reality space (in this case, a space consisting of only basic objects).

It should be noted that, in FIG. 7, there is only one host, namely the host A, which has an information server terminal for providing the virtual reality space (consisting of only basic objects) of a specific area. It is apparent that such a host may be installed in plural.

A host B has a shared server terminal 11B. The shared server terminal 11B controls update objects that constitute a virtual reality space (when put in it). The update objects are avatars for example representing users of the client terminals. Thus, the shared server terminal 11B allows a plurality of users to share the same virtual reality space. It should be noted, however, that the host B controls only the update objects located in a virtual reality space for only a specific area (for example, Tokyo) of the virtual reality spaces controlled by the host A. That is, the host B is dedicated to the virtual reality space of a specific area. Also, it should be noted that the network 15 is connected with, in addition to the host B, a host, not shown, having a shared server terminal for controlling update objects located in virtual reality spaces of other areas such as New York and London, stored in the host A.

A host C, like the host A, constitutes a WWW system for example and stores data including IP (Internet Protocol) addresses for addressing hosts (shared server terminals) that control update objects like the host B. Therefore, the shared server terminal addresses stored in the host C are uniformly related with URLs as with the case of the host A as mentioned above. In addition, the host C has a mapping server terminal 12 (a control server terminal). Receiving a URL via the network 15, the mapping server terminal 12 provides the IP address of the shared server terminal corresponding to the received URL via the network 15. It should be noted that FIG. 7 shows only one host, namely the host C, which has the mapping server terminal 12 for providing shared server terminal addresses. It will be apparent that the host C can be installed in plural.

The client terminal 13 (13-1, 13-2 or 13-3) receives a virtual reality space from the information server terminal 11A via the network 15 to share the received virtual reality space with other client terminals (including the service provider terminal 14), under the control of the shared server terminal 11B. Further, the client terminal 13 is also adapted to receive specific services (information) using the virtual reality space from the service provider terminal 14.

The service provider terminal 14, like the client terminal 13, receives a virtual reality space to share the same with the client terminal 13 (if there is another service provider terminal, it also shares this space). Therefore, as far as the capability of this portion is concerned, the service provider terminal 14 is the same as the client terminal 13.

Further, the service provider terminal 14 is adapted to provide specific services to the client terminal 13. It should be noted that FIG. 7 shows only one service provider terminal 14. It will be apparent that the service provider terminal may be installed in plural.

Figure 8:
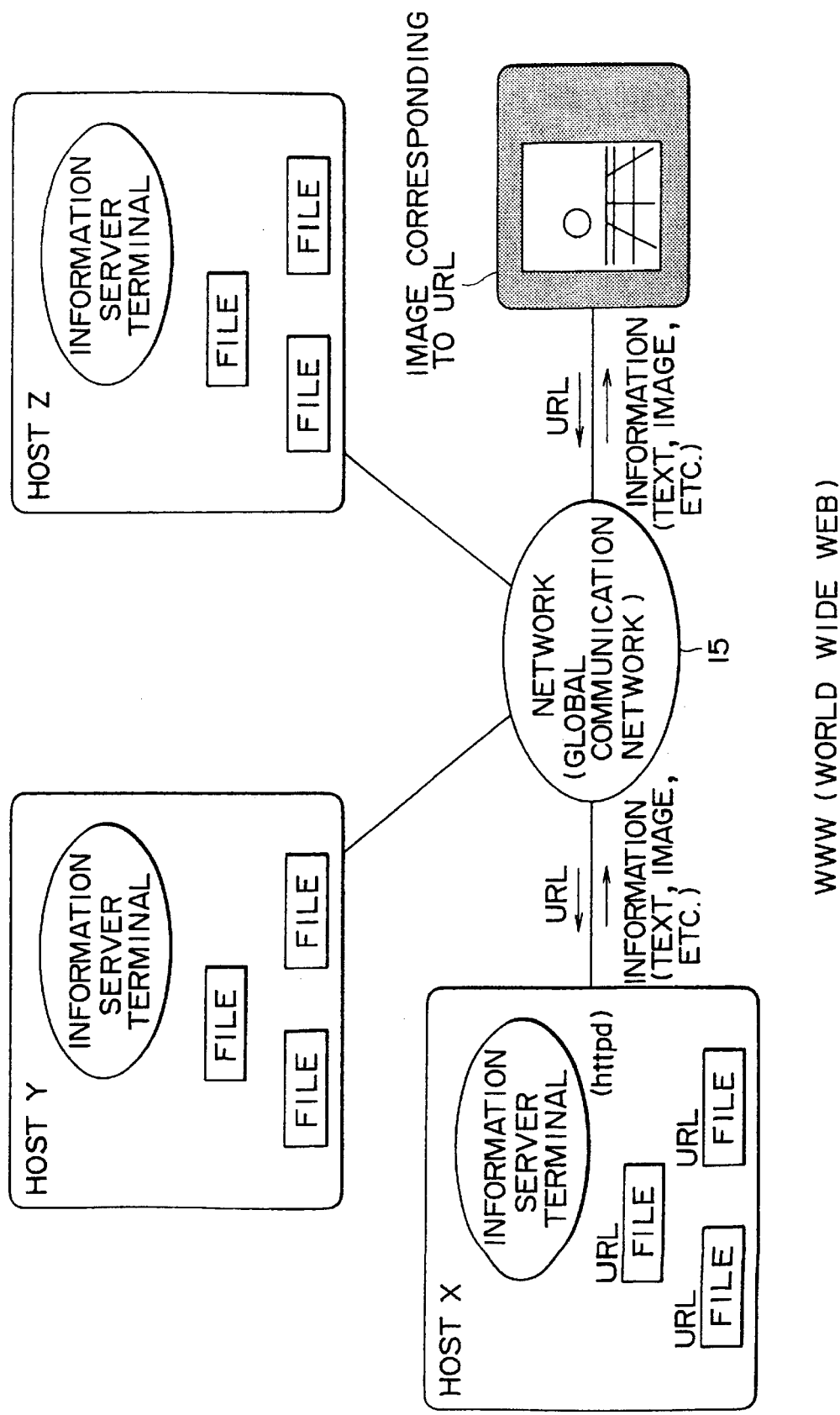
FIG. 8 is a diagram describing the WWW (World Wide Web)

The following briefly describes a WWW system constituted by the host A and the host C. Referring to FIG. 8, the WWW is one of the systems for providing information from hosts X, Y, and Z to unspecified users (client terminals) via the network 15 (the Internet in the case of the WWW). The information that can be provided in this system include not only texts but also graphics, images (including still images and moving pictures), voices, three-dimensional images, and hyper text which combines all these kinds of information.

Figures 9, 10:
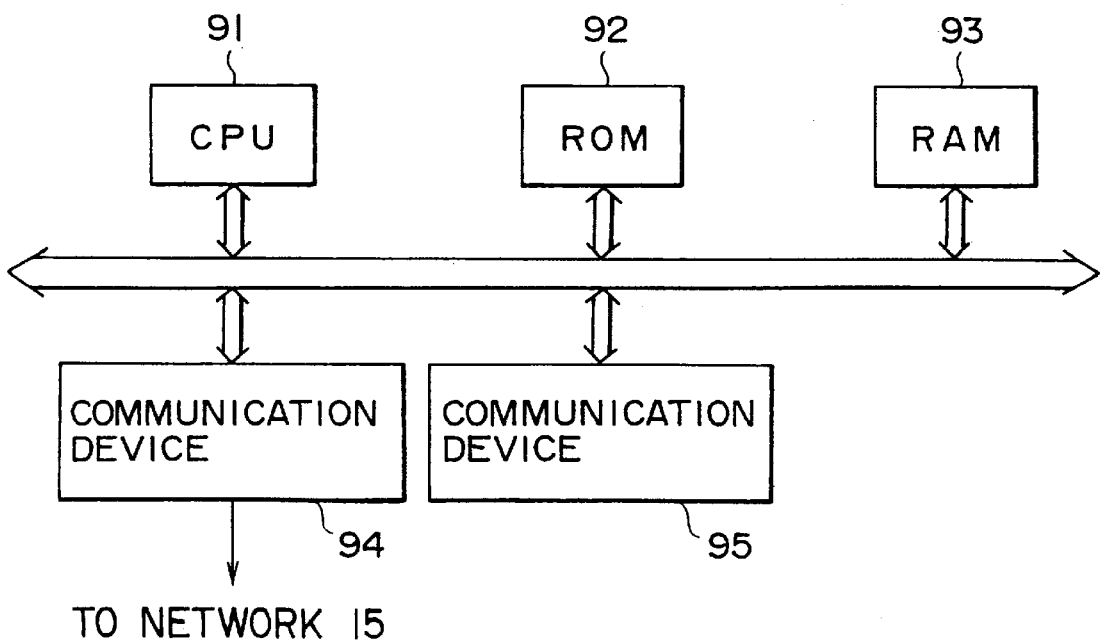
FIG. 9 is a diagram describing an example of URL (Uniform Resource Locator)
FIG. 10 is a diagram illustrating an example of the constitution of a mapping server terminal 12 of FIG. 7.

In the WWW, a URL which uniformly represents these pieces of information is determined. Specifying a specific URL, each user can obtain the information corresponding to the specified URL. As shown in FIG. 9, each URL is composed of a protocol type for representing a service type (http in the preferred embodiment of FIG. 9, which is equivalent to a command for retrieving a file corresponding to a file name to be described later and send the retrieved file), a host name indicating a destination of the URL (in the embodiment of FIG. 9, www.csl.sony.co.jp), and a file name of data to be sent (in the embodiment of FIG. 9, index.html) for example.

Each user operates the client terminal to enter a URL for desired information. When the URL is entered, the client terminal references a host name, for example, contained in the URL. A link with a host (in the embodiment of FIG. 8, the host X for example connected to the Internet) addressed by the host name is established. Then, at the client terminal, the URL is sent to the linked host, namely the host X, via the Internet. In the host X, an HTTP demon (httpd) is operating on the information server terminal (the WWW server terminal). Receiving the URL, the information server terminal sends back the information specified in the URL to the client terminal via the Internet.

The client terminal receives the information from the information server terminal to display the received information on its monitor as required. Thus, the user can get the desired information.

Therefore, stored in the host is only such data for describing elements (objects), which constitute a virtual reality space. This data includes data such as shapes of basic objects (for example, a rectangular prism and a cone), locations and attributes (color and texture for example) of these basic objects. The storage of this data allows provision of the virtual reality space (consisting only the basic objects in this case) to unspecified users. Namely, as long as the Internet is used for the network 15 and the WWW is used, virtual reality spaces can be provided to unspecified users world-wide with ease and at a low cost. THis is because the Internet itself already spans over almost the entire world and the description of the elements constituting each virtual reality space to be stored in hosts does not require changes in the information servers (WWW server terminals) constituting the WWW. It should be noted that the service for providing the description of the elements constituting a virtual reality space is upward compatible with existing services provided by the WWW.

Storing in a specific host (a mapping server terminal) the IP addresses of other hosts as information also allows the provision of the host IP addresses to unspecified users world-wide with ease.

It should be noted that it is difficult for a plurality of users to share the same virtual reality space if only the description (the data of a three-dimensional image for providing the virtual reality space of a specific area) of elements constituting the virtual reality space is stored in a host constituting the WWW. Namely, in the WWW, the information corresponding to a URL is only provided to a user and therefore no control for information transfer is performed. Hence, it is difficult to transfer between users the above-mentioned change information of update objects by using the WWW without changing its design. Therefore, in the cyberspace system of FIG. 7, the host B having the shared server terminal 11B and the host C having the mapping server 12 are installed to allow a plurality of users to share the same virtual reality space, details of which will be described later.

FIG. 10 shows an example of the constitution of the mapping server terminal 12 operating as the host C of FIG. 7. Components CPU 91 through communication device 94 in FIG. 7 generally to components described in connection with FIG. 2, so that the description of the components of FIG. 10 is omitted. A storage device 95 stores addresses, along with URLs, for identifying shared server terminals that control update objects (in the embodiment of FIG. 7, only the shared server terminal 11B is shown; actually, other shared server terminals, not shown, are connected to the network 15).

The following describes the operations of the client terminal 13 (or the service provider terminal 14), the information server terminal 11A, the mapping server terminal 12, and the shared server terminal 11B with reference to the flowcharts of FIGS. 11 through 14.

Figure 11:
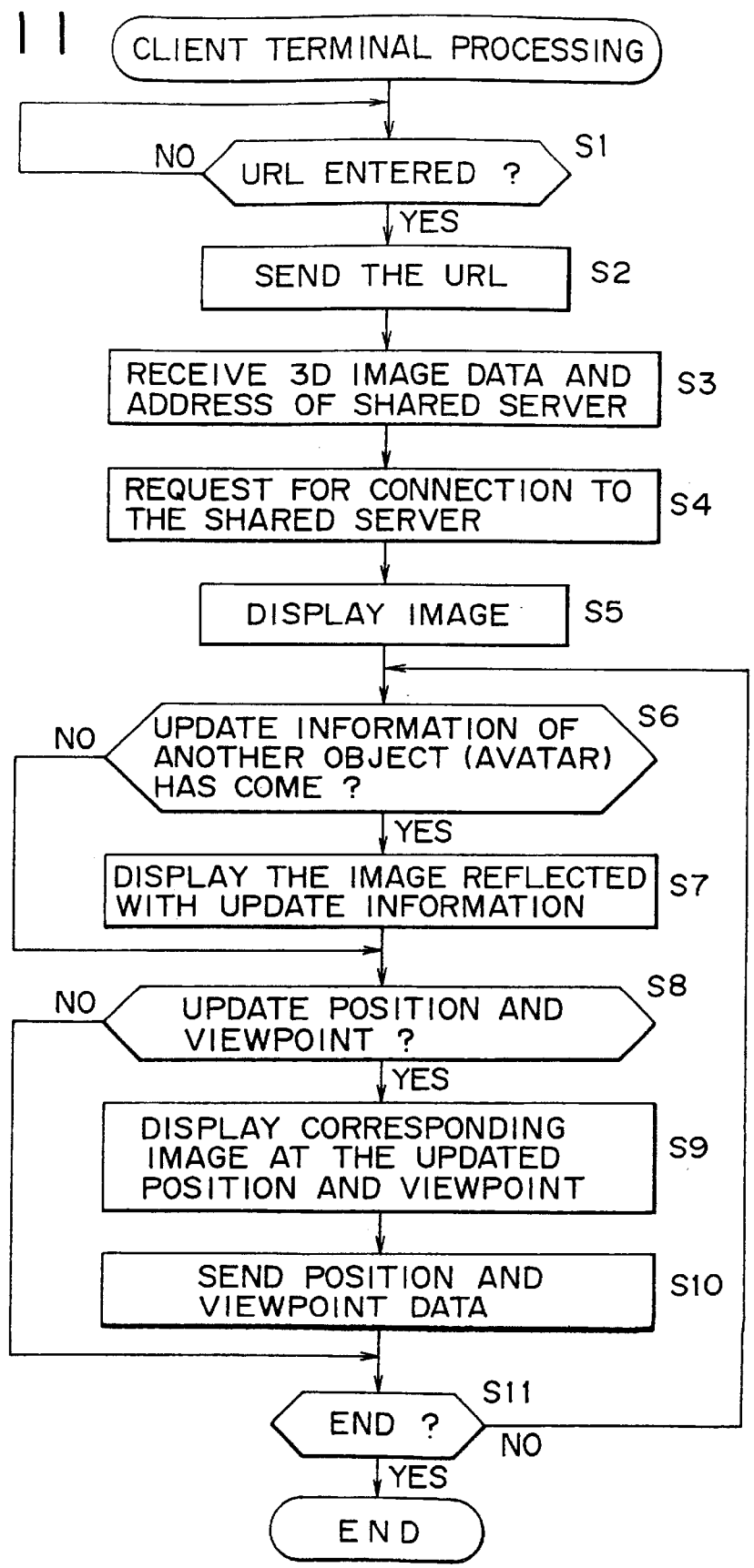
FIG. 11 is a flowchart describing the operations of the client terminal 13 (service provider terminal 14)

Now, referring to FIG. 11, there is shown an example of processing by the client terminal 13 (or the service provider terminal 14). In step S1, the CPU 41 checks whether a virtual reality space URL has been entered or not. If no virtual reality space URL has been found, the processing remains in step S1. If a virtual reality space URL has been found in step S1, namely, if a virtual reality space URL corresponding to a desired virtual reality space entered by the user by operating the keyboard 49a has been received by the CPU 41 via interface 48, the process goes to step S2. In step S2, a WWW system is constituted as described with reference to FIG. 8 and the virtual reality space URL is transmitted from the communication device 44 via the network 15 to the information server terminal of a specific host (in this case, the information server terminal 11A of the host A) that has the information server terminal, thereby establishing a link.

Further, in step S2, an address acquisition URL related to the virtual reality space URL is read from the storage device 50 to be transmitted from the communication device 44 via the network 15 to the mapping server terminal of a specific host (in this case, mapping server terminal 12 of the host C for example) that constitutes the WWW system, thereby establishing a link.

Then, the process goes to step S3. In step S3, data (three-dimensional image data) of the virtual reality space or the IP address of the shared server terminal 11B corresponding to the virtual reality space URL received in step S2 or the address acquisition URL is received by the communication device 44.

Namely, in step S2, the virtual reality space URL is transmitted to the information server terminal 11A. When this virtual reality space URL is received by the information server terminal 11A, the data of the corresponding virtual reality space is transmitted to the client terminal 13 via the network 15 in step S22 of FIG. 12 (described below). Thus, in step S3, the data of the virtual reality space transmitted from the information server terminal 11A are received. It should be noted that the received virtual reality space data is transferred to the RAM 43 to be stored there (or first stored in the storage device 50 to be transferred to the RAM 43).

Also, in step S2, the address acquisition URL is transmitted to the mapping server terminal 12. When the address acquisition URL is received by the mapping server terminal 12, the IP address of the shared server terminal corresponding to the URL is transmitted to the client terminal 13 via the network 15 in step S32 of FIG. 13 (described below). Thus, in step S3, the IP address of the shared server terminal 11B transmitted from the mapping server 12 is received.

As described above, the address acquisition URL related to the entered virtual reality space URL corresponds to the IP address of the shared server terminal that controls the update object placed in the virtual reality space corresponding to that virtual reality space URL. Therefore, for example, if the entered virtual reality space URL corresponds to a virtual reality space of Tokyo and the shared server terminal 11B owned by the host B controls the update objects placed in the Tokyo virtual reality space, the IP address of the shared server terminal 11B is received in step S3. Consequently, the user can automatically get the location (the IP address) of the shared server terminal that controls the virtual reality space of a desired area even if the user does not know which shared server terminal controls the update objects in a virtual reality space in which area.

It should be noted that, in steps S2 and S3, the processing of transmitting the virtual reality space URL and the address acquisition URL and receiving the virtual reality space data and the IP address is actually performed by transmitting the virtual reality space URL, receiving the data of the corresponding virtual reality space, transmitting the address acquisition URL, and then receiving the corresponding IP address in this order, by way of example.

When the virtual reality space data and the shared server terminal IP address are received in step S3, the process goes to step S4. In step S4, a connection request is transmitted from the communication device 44 via the network 15 to the shared server terminal (in this case, the shared server terminal 11B for example) corresponding to the IP address (the shared server terminal IP address) received in step S3. This establishes a link between the client terminal 13 and the shared server terminal 11B. Further, in step S3, after the establishment of the link, the avatar (namely, the update object) representing a user stored in the storage device 50 is transmitted from the communication device 44 to the shared server terminal 11B.

When the shared server terminal 11B receives the user's avatar, the same is then transmitted to the client terminals of other users existing in the same virtual reality space (in this case, that of Tokyo as mentioned above). Then, on the client terminals of other users, the transmitted avatar is placed in the virtual reality space, thus implementing the sharing of the same virtual reality space among a plurality of users.

It should be noted that, rather than providing the user's avatar from the client terminal 13 to the shared server terminal 11B, a predetermined avatar may also be allocated from the shared server terminal 11B to each user who has accessed the same. Also, in the client terminal 13, the avatar of the user himself who uses this terminal can be placed and displayed in the virtual reality space as shown in FIGS. 36 and 37; in the real world, however, the user cannot see himself, so that it is desirable that the user's avatar not be displayed on the user's client terminal in order to make the virtual reality space as real as possible.

When the processing of step S4 has been completed, the process goes to step S5. In step S5, the data of the virtual reality space that can be seen when the same is seen from a specific viewpoint and position are read from the RAM 43 by the CPU 41 to be supplied to the display device 45. Thus, the specific virtual reality space is shown on the display device 45.

Then, in step S6, the communication device 44 determines whether update information of another user's avatar has been sent from the shared server terminal 11B.

As described above, the user can update the position or viewpoint of his own avatar by operating the viewpoint input device 49c, the behavior input device 49d or mouse 49b. If the update of the position or viewpoint of the avatar is instructed by using this capability, the CPU 41 receives the instruction via the interface 48. According to the instruction, the CPU 41 performs processing for outputting positional data or viewpoint data corresponding to the updated position or viewpoint as update information to the shared server terminal 11B. In other words, the CPU 41 controls the communication device 44 to transmit the update information to the shared server terminal 11B.

Receiving the update information from the client terminal, the shared server terminal 11B outputs the update information to other client terminals in step S44 of FIG. 14 (described below). It should be noted the shared server terminal 11B is adapted to transmit the avatar received from the client terminal that requested access to client terminals of other users, this avatar being transmitted also as update information.

When the update information has come as mentioned above, it is determined in step S6 that update information of the avatar of another user has come from the shared server terminal 11B. In this case, this update information is received by the communication device 44 to be outputted to the CPU 41. The CPU 41 updates the display on the display device 45 according to the update information in step S7. That is, if the CPU 41 receives the positional data or viewpoint data from another client terminal as update information, the CPU 41 moves or changes (for example, the orientation of the avatar) the avatar of that user according to the received positional data or viewpoint data. In addition, if the CPU 41 receives the avatar from another client terminal, the CPU 41 places the received avatar in the currently displayed virtual reality space at a specific position. It should be noted that, when the shared server terminal 11B transmits an avatar as update information, the shared server terminal also transmits the positional data and viewpoint data of the avatar along with the update information. The avatar is displayed on the display device 45 according to these positional data and viewpoint data.

When the above-mentioned processing has come to an end, the process goes to step S8.

Meanwhile, if, in step S6, no update information of the avatar of another user has come from the shared server terminal 11B, the process goes to step S8, skipping step S7. In step S8, the CPU 41 determines whether the position or viewpoint of the avatar of the user of the client terminal 13 has been updated or not by operating the viewpoint input device 49c or the behavior input device 49d.

In step S8, if the CPU 41 determines that the avatar position or viewpoint has been updated, namely, if the viewpoint input device 49c or the behavior input device 49d has been operated by the user, the process goes to step S9. In step S9, the CPU 41 reads data of the virtual reality space corresponding to the position and viewpoint of the avatar of the user based on the entered positional data and viewpoint data, makes calculations for correction as required, and generates the image data corresponding to the correct position and viewpoint. Then, the CPU 41 outputs the generated image data to the display device 45. Thus, the image (virtual reality space) corresponding to the viewpoint and position entered from the viewpoint input device 49c and the behavior input device 49d is displayed on the display device 45.

Further, in step S10, the CPU 41 controls the communication device 44 to transmit the viewpoint data or the positional data entered from the viewpoint input device 49c or the behavior input device 49d to the shared server terminal 11, upon which the process goes to step S11.

Here, as described above, the update information coming from the client terminal 13 is received by the shared server terminal 11B to be outputted to other client terminals. Thus, the avatar of the user of the client terminal 13 is displayed on the other client terminals.

On the other hand, in step S8, if CPU 41 determines that the avatar's position or viewpoint has not been updated, the process goes to step S11 by skipping steps S9 and S10. In step S11, the CPU 41 determines whether the end of the update data input operation has been instructed by operating a predetermined key on the keyboard. If the end has not been instructed, the process goes back to step S6 to repeat the processing.

Figure 12:
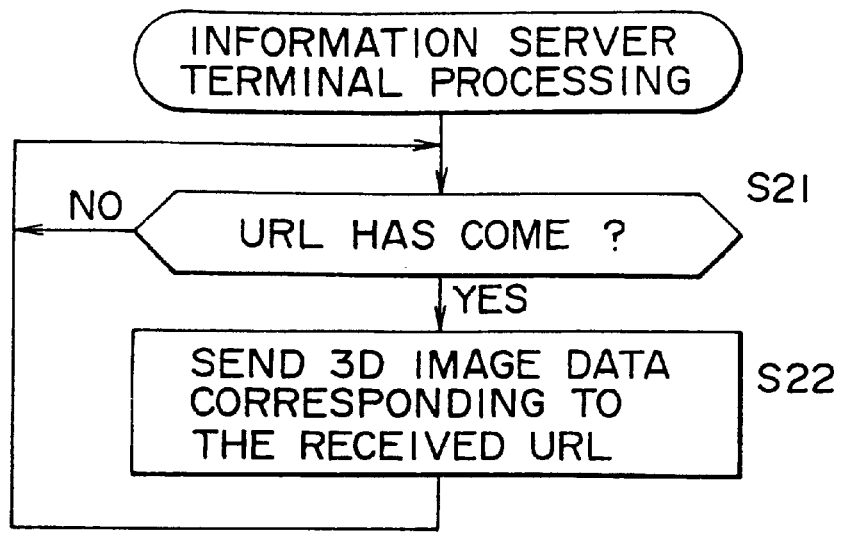
FIG. 12 is a flowchart describing the operations of an information server terminal 11A.

Referring to the flowchart of FIG. 12, there is shown an example of the processing by the information server terminal 11A. First, in the information server terminal 11A, the communication device 24 determines in step S21, whether a virtual reality space URL has come from the client terminal 13 via the network 15. If, in step S21, the communication device 24 determines that no virtual reality space URL has come, the process goes back to step S21. If the virtual reality space URL has come, the same is received by the communication device 24, upon which the process goes to step S22. In step S22, the data of the virtual reality space related to the virtual reality space URL received by the communication device 24 are read by the CPU 21 to be transmitted via the network 15 to the client terminal 13 that transmitted the virtual reality space URL. Then, the process goes back to step S21 to repeat the above-mentioned processing.

Figure 13:
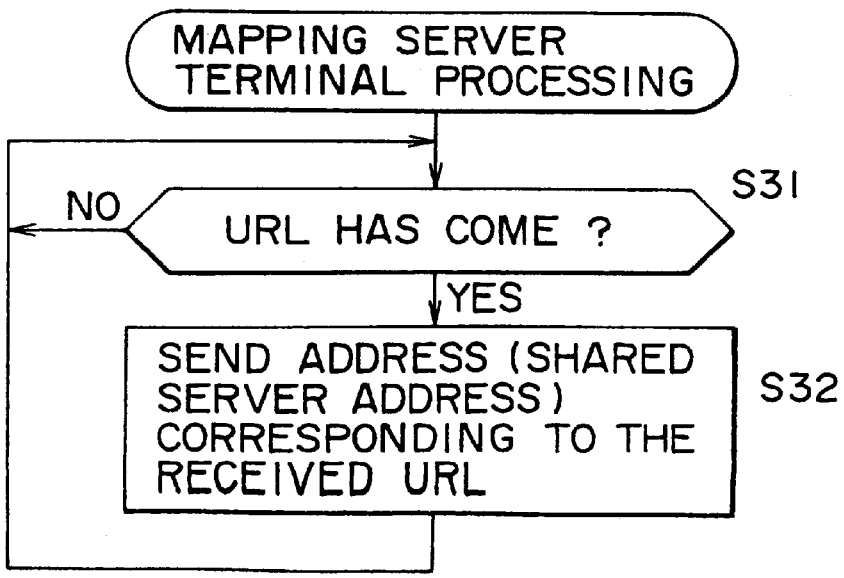
FIG. 13 is a flowchart describing the operations of a mapping server terminal 12.

FIG. 13 shows an example of the processing by the mapping server terminal 12. In the mapping server terminal 12, the communication device 94 determines in step S31, whether an address acquisition URL has come from the client terminal 13 via the network 15. If no address acquisition URL has come, the process goes back to step S31. If the address acquisition URL has come, the same is received by the communication device 94, upon which the process goes to step S32. In step S32, the IP address (the IP address of the shared server terminal) related to the address acquisition URL received by the communication device 24 is read from the storage device 95 by the CPU 91 to be transmitted via the network 15 to the client terminal 13 that transmitted the address acquisition URL. Then, the process goes back to step S31 to repeat the above-mentioned processing.

Figure 14:
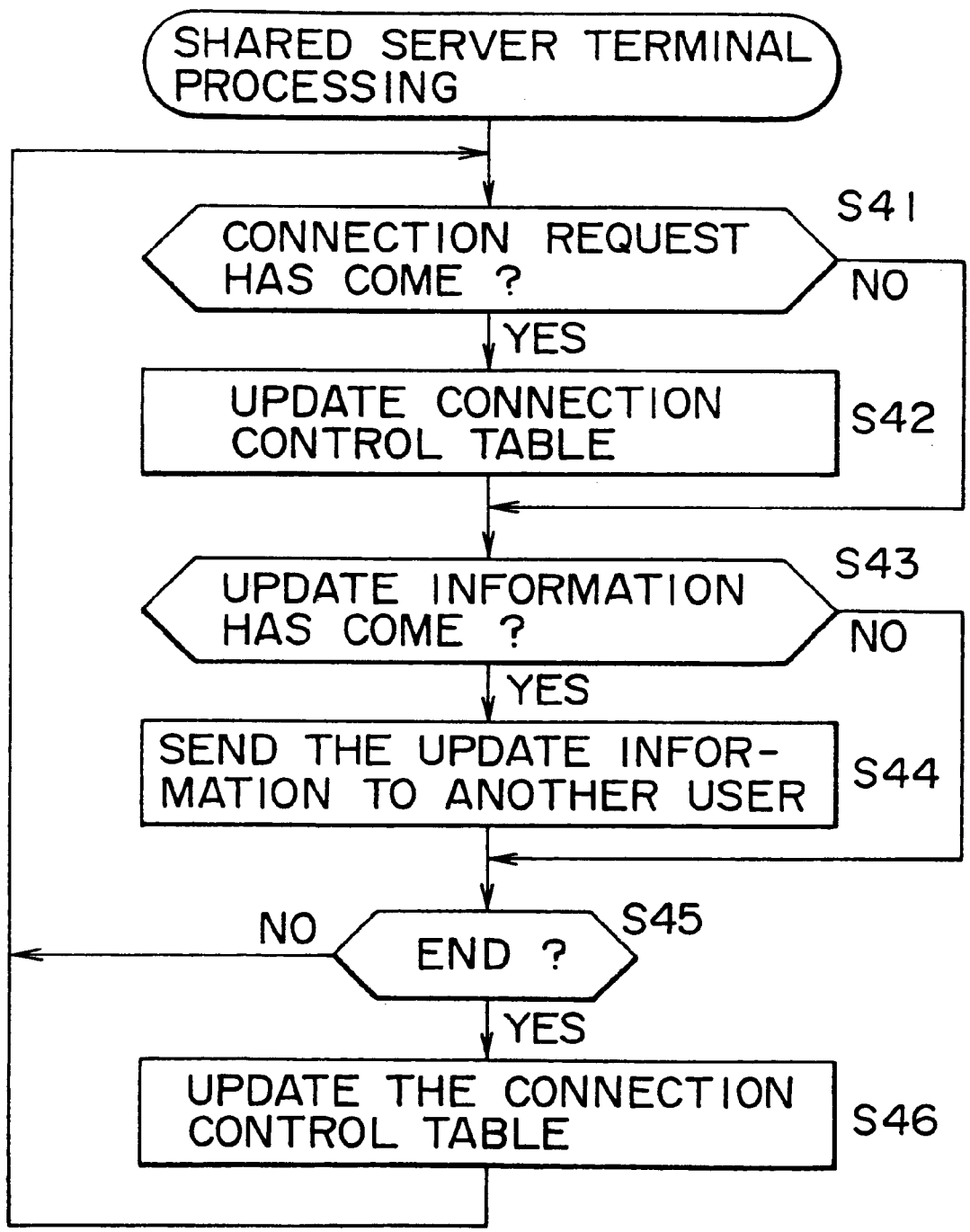
FIG. 14 is a flowchart describing the operations of a shared server terminal 11B.

FIG. 14 shows an example of the processing by the shared server terminal 11B. In the shared server terminal 11B, the communication device 24 determines, in step S41, whether a connection request has come from the client terminal 13 via the network 15. If no connection request has come in step S41, the process goes to step S43 by skipping step S42. If the connection request has come in step S41, that is, if the client terminal 13 has made the connection request to the shared server terminal 11B in step S4 of FIG. 11, the communication link with the client terminal 13 is established by the communication device 24, upon which the process goes to step S42.

In step S42, a connection control table stored in the RAM 23 is updated by the CPU 21. Namely, it is necessary for the shared server terminal 11B to recognize the client terminal 13 with which the shared server terminal 11B is linked, in order to transmit update information coming from the client terminal 13 to other client terminals. To do so, when the communication link with client terminals has been established, the shared server terminal 11B registers the information for identifying the linked client terminals in the connection control table. That is, the connection control table provides a list of the client terminals currently linked to the shared server terminal 11B. The information for identifying the client terminals include the source IP address transmitted from each client terminal as the header of TCP/IP packet and a nickname of the avatar set by the user of each client terminal.

Then, the process goes to step S43, in which the communication device 24 determines whether the update information has come from the client terminal 13. If, in step S43, no update information has been found, the process goes to step S45 by skipping step S44. If the update information has been found in step S43, namely, if the client terminal 13 has transmitted, in step S10 of FIG. 11, positional data and viewpoint data as the update information to the shared server terminal 11B (or, in step S4 of FIG. 11, the client terminal 13 has transmitted the avatar as the update information to the shared server terminal 11B after transmission of the connection request), the update information is received by the communication device 24, upon which the process goes to step S44. In step S44, the CPU 21 references the connection control table stored in the RAM 23 to transmit the update information received by the communication device 24 to other client terminals than the client terminal which transmitted that update information.

It should be noted that the above-mentioned update information is received by the client terminal 13 in step S6 of FIG. 11 as described above. At this moment, the IP address of the source of each client terminal controlled by the connection control table is used.

Then, the process goes to step S45, in which the CPU 21 determines whether the end of processing has been instructed by the client terminal 13. If the end of processing has not been instructed, the process goes back to S41 by skipping step S46. If the end of processing has been instructed, the process goes to step S46. In step S46, the link with the client terminal 13 from which the instruction has come is disconnected by the communication device 24. Further, from the connection control table, the information associated with the client terminal 13 is deleted by the CPU 21, upon which the process goes back to step S41.

Thus, the control of the update objects is performed by the shared server terminal 11B and the control (or provision) of the basic objects is performed by the information server terminal 11A constituting the WWW of the Internet used world-wide, thereby easily providing virtual reality spaces that can be shared by unspecified users world-wide. It should be noted that the specifications of the existing WWW system need not be modified to achieve the above-mentioned objective.

Provision of the virtual reality space data by use of the WWW system need not create any new web browser because the transfer of these data can be made using related art web browsers such as the Netscape Navigator (trademark) offered by Netscape Communications, Inc. for example.

Moreover, because the IP address of the shared server terminal 11B is provided by the mapping server terminal 12, the user can share a virtual reality space with other users without knowing the address of the shared server terminal 11B.

As described with reference to FIGS. 5 and 6, if the local IDs of objects used on the client terminals 13-1 through 13-3 are different between these client terminals, the mapping server terminal 12 or the shared server terminal 11B has the conversion table between the local IDs and the global IDs through which the conversion of the different local IDs is performed.

In the above-mentioned preferred embodiments of the invention, the basic objects are supplied to each client terminal 13 via the network 15; however, it is also possible to store the basic objects in an information recording medium such as a CD-ROM and distribute the same to each user in advance. In this case, each client terminal 13 is constituted as shown in FIG. 15. To be more specific, in the embodiment of FIG. 15, a CD-ROM drive 100 is connected to the interface 48 to drive a CD-ROM 110 in which a virtual reality composed of basic objects is stored. The other part of the constitution is the same as that of FIG. 3.

Thus, provision of the data of basic objects from the CD-ROM 110 eliminates the time for transferring the data via the network 15, increasing processing speed.

Alternatively, without using the CD-ROM 110, the data of basic objects supplied from the information server terminal 11A may be stored in the storage device 50 only for the first time to be subsequently read for use.

Namely, as shown in FIG. 16, the basic object data can be stored in the storage device 30 of the information server terminal 11A (for cases 1 through 3), the storage device 50 of the client terminal 13 (for cases 4 through 6) or the CD-ROM 110 of the client terminal 13 (for cases 7 through 9).

Figure 23:
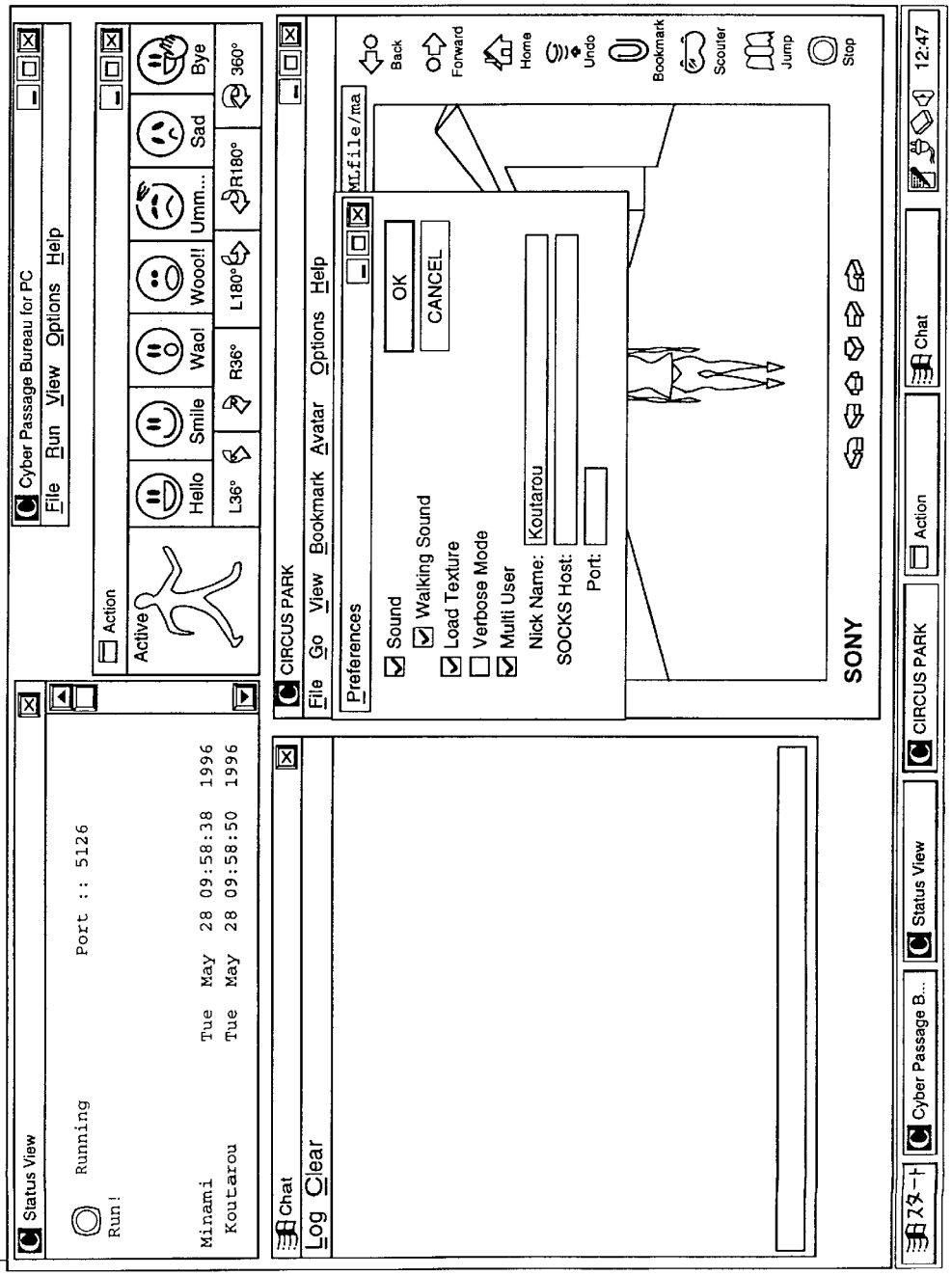
FIG. 23 is a diagram illustrating still another example of display on the shared server terminal 11B-1 of FIG. 19.

On the other hand, the update object data can be stored in the storage device 30 of the information server terminal 11A (for case 1) or the storage device 30 of the shared server terminal 11B (for cases 2 through 9). In the case in which the update object data is stored in the shared server terminal 11B, that shared server terminal may be the shared server terminal 11B-1 in Japan (for case 2, 5 or 8) or the shared server terminal 11B-2 in the US (for case 3, 6 or 9) as shown in FIG. 23 for example. In this instance, the URL of the update object data is stored on the mapping server terminal 12.

If the update object data is stored on the information server terminal 11A, the URL of the update object data is the default URL controlled by the information server terminal 11A (in case of 1). Or if the shared server terminal 11B is specified by the user manually, the URL of update object data is the specified URL (in case of 4 or 7).

Figure 17:
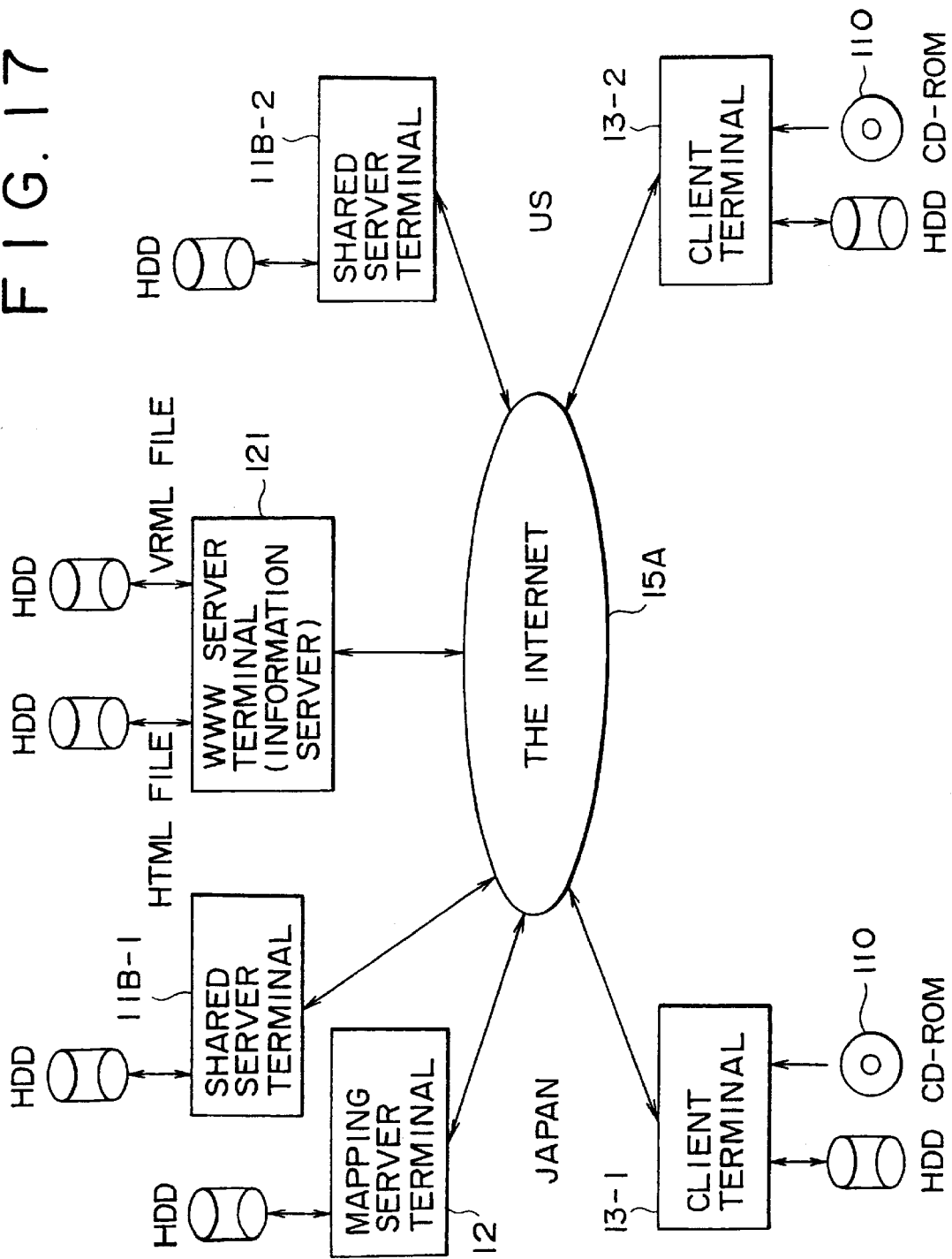
FIG. 17 is a diagram describing the arrangement of basic objects and update objects.

Referring to FIG. 17, the data in each of the above-mentioned cases of FIG. 16 flows as follows. In case 1, the basic object data is read from a VRML file (to be described later in detail) stored in an HDD (Hard Disk Drive) storage device of a WWW server terminal 121 operating as the information server terminal 11B to be supplied to the client terminal 13-1 for example via the Internet 15A operating as the network 15. The storage device of the WWW server terminal 121 also stores update object data. To be more specific, when the basic object data is read in the WWW server terminal 121, the URL of the corresponding update object data is stored as the default URL in the storage device of the WWW server terminal 121 in advance. From this default URL, the update object data is read to be supplied to the client terminal 13-1.

In case 2, the basic object data is supplied from the WWW server terminal 121 to the client terminal 13-1 in Japan via the Internet 15A. On the other hand, the update object data is supplied from the shared server terminal 11B-1 in Japan specified by the mapping server terminal 12 to the client terminal 13-1 via the Internet 15A.

In case 3, the basic object data is supplied from the WWW server terminal 121 to the client terminal 13-2 in the US via the Internet 15A. The update object data is supplied from the shared server terminal 11-2 in the US specified by the mapping server terminal 12 via the Internet 15A.

In case 4, the basic object data is stored in advance in the storage device 50 of the client terminal 13-1 in Japan for example. The update object data is supplied from the shared server terminal 11-2 in the US for example specified by the client terminal 13-1.

In case 5, the basic object data is stored in advance in the storage device 50 of the client terminal 13-1. The update object data is supplied from the shared server terminal 11B-1 in Japan specified by the mapping server terminal 12 via the Internet 15A.

In case 6, the basic object data is stored in advance in the storage device 50 of the client terminal 13-2 in the US. The update object data is supplied from the shared server terminal 11B-2 in the US specified by the mapping server terminal 12 to the client terminal 13-2 via the Internet 15A.

In case 7, the basic object data stored in the CD-ROM 110 are supplied to the client terminal 13-1 in Japan for example via the CD-ROM drive 100. The update object data is supplied from the shared server terminal (for example, the shared server terminal 11B-1 or 11B-2) specified by the client terminal 13-1.

In case 8, the basic object data is supplied from the CD-ROM 110 to the client terminal 13-1. The update object data is supplied from the shared server terminal 11B-1 in Japan specified by the mapping server terminal 12 in Japan.

In the case 9, the basic object data is supplied from the CD-ROM 110 to the client terminal 13-2 in the US. The update object data is supplied from the shared server terminal 11B-2 in the US specified by the mapping server terminal 12 via the Internet 15A.

In what follows, the software for transferring the above-mentioned virtual reality space data to display the same on the display device is described. In the WWW system, document data is transferred in a file described in HTML (Hyper Text Markup Language). Therefore, the text data is registered as an HTML file.

On the other hand, in the WWW system, three-dimensional graphics data is transferred for use by describing the same in VRML (Virtual Reality Modeling Language) or E-VRML (Enhanced Virtual Reality Modeling Language). Therefore, as shown in FIG. 31 for example, a WWW server terminal 112 of remote host 111 constituting the above-mentioned information server terminal 11A, the shared server terminal 11B or the mapping server terminal 12 stores in its storage device both HTML and E-VRML files.

In an HTML file, linking between different files is performed by URL. In a VRML or E-VRML file, such attributes as WWWAnchor and WWWInline can be specified for objects. WWWAnchor is an attribute for linking a hyper text to an object, a file of a link destination being specified by URL. WWWInline is an attribute for describing an external view of a building for example in parts of external wall, roof, window, and door for example. An URL can be related to each of the parts. Thus, also in VRML or E-VRML files, link can be established with other files by means of WWWAnchor or WWWInline.

For application software (a WWW browser) for notifying a WWW server terminal of a URL entered in a client terminal in the WWW system to interpret and display an HTML file coming from the WWW server terminal, Netscape Navigator (registered trade name) (hereafter referred to simply as Netscape) of Netscape Communications, Inc. is known. For example, the client terminal 13 also uses Netscape to user the capability for transferring data with the WWW server terminal.

It should be noted, however, that this WWW browser can interpret an HTML file and display the same, but this WWW browser cannot interpret and display a VRML or E-VRML file although it can receive these files. Therefore, a VRML browser is required which can interpret a VRML file and an E-VRML file and draw and display them as a three-dimensional space.

Details of VRML are disclosed in the Japanese translation of "VRML: Browsing & Building Cyberspace," Mark Pesce, 1995, New Readers Publishing, ISBN 1-56205-498-8, a translation being entitled "Getting to Know VRML: Building and Browsing Three-Dimensional Cyberspace," translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prentice Hall Publishing, ISBN4-931356-37-0.

CyberPassage (trademark) has been developed as application software that includes this VRML browser.

CyberPassage is composed of the following three software programs:

(1) CyberPassage Browser

This is a VRML browser which is based on VRML 1.0 and prefetches the capabilities (motion and sound) of VRML 2.0 to support E-VRML that provides moving picture capability. In addition, this provides the multi-user capability which can be connected to CyberPassage Bureau. For the script language, TCL/TK is used.

(2) CyberPassage Conductor

This is a VRML authoring system which is based on E-VRML based on VRML 1.0. This tool can not only simply construct a three-dimensional world but also give a behavior, a sound, and an image to the three-dimensional world with ease.

(3) CyberPassage Bureau

This is used for a server terminal system for enabling people to meet each other in a virtual reality space constructed on a network, connected from the CyberPassage Browser.

In the client terminals 13-1 and 13-2 shown in FIG. 19, CyberPassage Browser is installed in advance and executed. In the shared server terminals 11B-1 and 11B-2, CyberPassage Bureau is installed in advance and executed. FIG. 19 shows an example in which CyberPassage Browser is installed from the CD-ROM 110 and executed on the client terminal 13-1 and, in order to implement the shared server terminal capability and the client terminal capability on a single terminal, CyberPassage Bureau and CyberPassage Browser are installed from the CD-ROM 110 in advance and executed.

Figure 18:
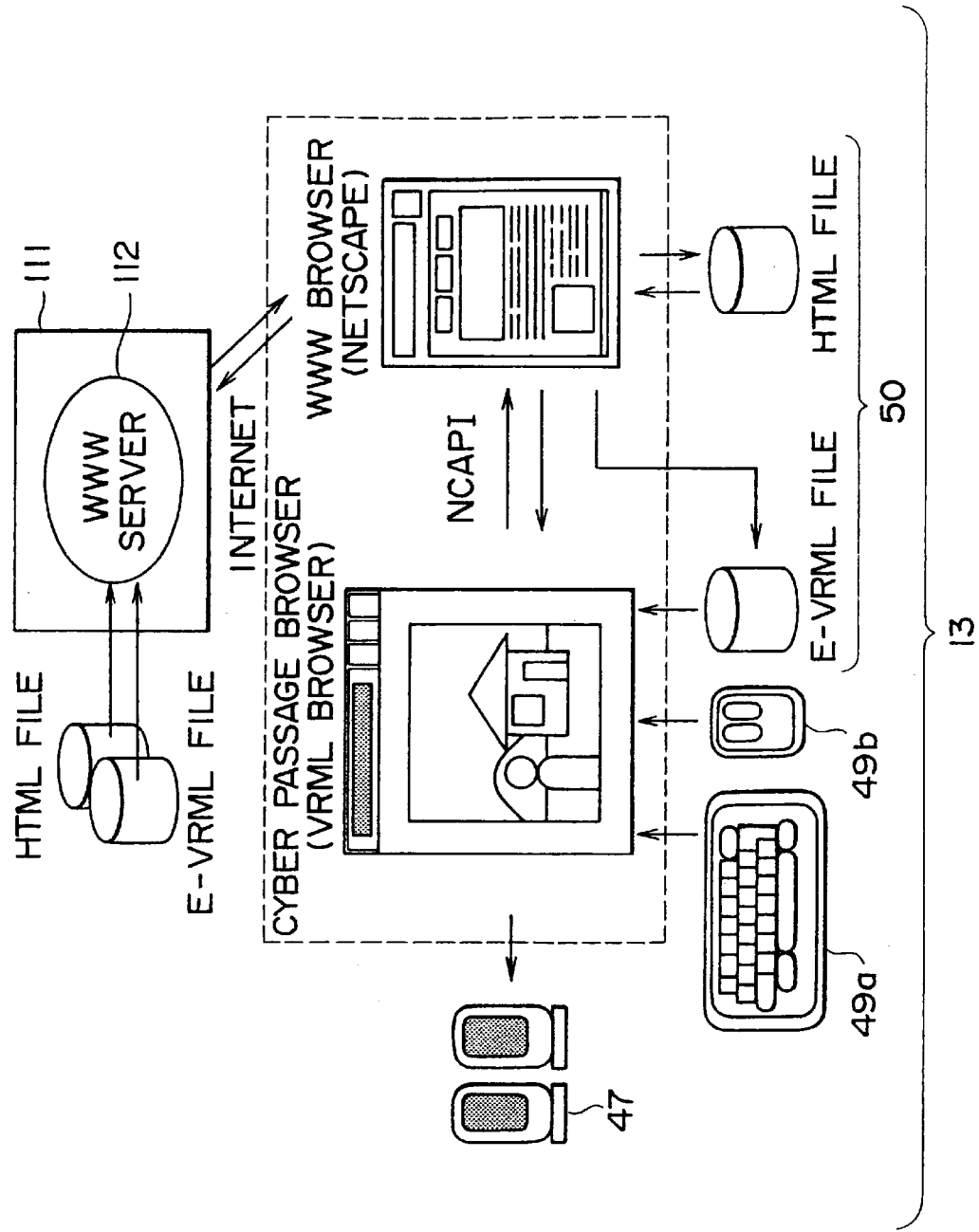
FIG. 18 is a diagram describing the software for implementing the cyberspace system.

As shown in FIG. 18, CyberPassage Browser transfers a variety of data with Netscape as a WWW browser based on NCAPI (Netscape Client Application Programming Interface) (trademark).

Receiving an HTML file and a VRML file or E-VRML file from the WWW server terminal 112 via the Internet, Netscape stores the received files in the storage device 50. Netscape processes only the HTML file. The VRML or E-VRML file is processed by CyberPassage Browser.

E-VRML is an enhancement of VRML 1.0 by providing behavior and multimedia (sound and moving picture) and was proposed to the VRML Community, September 1995. The basic model (event model) for describing motions as used in E-VRML has been incorporated into the Moving Worlds proposal, one the current VRML 2.0 proposals.

In what follows, CyberPassage Browser will be outlined. A sample of this browser was provided in the CD-ROM translation of "VRML: Browsing & Building Cyberspace," Mark Pesce, 1995, New Readers Publishing. After installing this browser, selecting "Manual" from "CyberPassage Folder" of "Program" of the start menu of Windows 95 (trademark) (or in Windows NT (trademark), the Program Manager) displays the instruction manual of the browser.

Operating environment of CyberPassage Browser:

The operating environment of CyberPassage Browser is as shown in FIG. 20. The minimum operating environment must be at least satisfied. However, Netscape Navigator need not be used if CyberPassage Browser is used as a standalone VRML browser. In particular, on using multi-user, it is a desirable and recommended operating environment.

Installing CyberPassage Browser:

CyberPassage Browser can be usually installed in the same way as Netscape is installed. To be more specific, vscplb3a.exe placed in the Sony (trademark) directory of the furnished CD-ROM is used as follows for installation.

(1) Double-click vscplb3a.exe. The installation package is decompressed into the directory indicated by "Unzip To Directory" column. The destination directory may be changed as required.

(2) Click "Unzip" button. And the installation package is decompressed.

(3) "12 files unzipped successfully" appears. Click the "OK" button.

(4) When "Welcome" window appears, click "NEXT" button.

(5) Carefully read "Software License Agreement". If agreeable, press the "Yes" button; if not, press the "No" button.

(6) Check the directory of installation. Default is "Program Files SonyCyberPassage".

(7) If use of the above-mentioned directory is not wanted, press "Browse" button and select another directory. Then, press "Next" button.

(8) To read "readme" file here, click the "Yes" button.

(9) When the installation has been completed, click the "OK" button.

Starting CyberPassage Browser:

Before starting CyberPassage Browser, the setting of Netscape Navigator must be performed. If CyberPassage Browser is used standalone, this setting need not be performed; just select "CyberPassage Folder . . . CyberPassage" of "Program" of the start menu and start. The following setting may be automatically performed at installation.

(1) From the "Options" menu of Netscape Navigator, execute "General Preference" and open the "Preference" window. From the upper tab, select "Helper Applications".

(2) Check the "File type" column for "x-world/x-vrml". If it is found, go to (4) below.

(3) Click the "Create New Type" button. Enter "x-world" in "Mime Type" column and "x-vrml" in "Mime SubType" column. Click the "OK" button. Enter "wrl" in the "Extensions" column.

(4) Click the "Launch the Application" button. Enter the path name of CyberPassage Browser in the text column below this button. The default is "\Program Files\Sony\CyberPassage\bin\vscp.exe".

(5) Click the "OK" button.

Thus, the setting of Netscape Navigator has been completed. Start CyberPassage Browser as follows:

(1) In the "File . . . Open File" menu of Netscape, read the "readme.htm" of the sample CD-ROM.

(2) Click the link to the sample world, and CyberPassage is automatically started, loading the sample world from the CD-ROM.

Uninstalling CyberPassage Browser:

Execute "Uninstall" from "CyberPassage Folder" of "Program" of the start menu (or in Windows NT, the Program Manager), and CyberPassage Browser will be uninstalled automatically.

Operating the CyberPassage Browser:

CyberPassage Browser may be operated intuitively with the mouse 49*b*, the keyboard 49*a*, and the buttons on screen.

Moving around in the three-dimensional space:

In the three-dimensional space provided by VRML, such behaviors as done in real world as forward, backward, rotate right and rotate left for example can be done. CyberPassage Browser implements such behaviors through the following interface:

By the keyboard:

The arrow keys, not shown, on the keyboard 49*a* can be used to generate predetermined behaviors, such as rotate right, rotate left, move forward, and move backward.

By the mouse:

Operate the mouse with its left button.

(1) Keep the left button of the mouse 49*b* pressed in the window of CyberPassage and move the mouse:

to the right for rotate right;

to the left for rotate left;

up for forward; and down for backward.

The velocity of behavior depends on the displacement of the mouse.

(2) With the Ctrl (Control) key, not shown, on the keyboard 49*a*, kept pressed, click an object on screen to get to the front of the clicked object.

The following precautions are required:

If a collision with an object occurs, a collision sound is generated and the frame of the screen blinks in red. If this happens, any forward movement is blocked. Moving directions must be changed.

If the user is lost or cannot see anything in the space, click "Home" button on the right of screen, and the user can return to the home position.

Jumping eye:

While navigating through a three-dimensional space, the user may be lost at occasions. If this happens, the user can jump up to have an overhead view around.

(1) Click "Jump" button on the right of screen, and the user enters the jumping eye mode and jumps to a position from which the user can look down the world.

(2) Click "Jump" button again, and the user goes down to the original position.

(3) Alternatively, click any place in the world, and the user gets down to the clicked position.

Selecting an object:

When the mouse cursor is moved around on the screen, the shape of the cursor is transformed into a grabber (hand) on an object. In this state, click the left button of the mouse, and the action of the grabbed object is called.

Loading a VRML file:

A VRML file can be loaded as follows:

In Netscape, click the link to the VRML file;

From the "File . . . Open File" menu of CyberPassage, select the file having extension "url" on disc.

In the "File . . . Open URL" menu, enter the URL.

Click the object in the virtual space for which "URL" is displayed on the mouse cursor.

Figure 24:
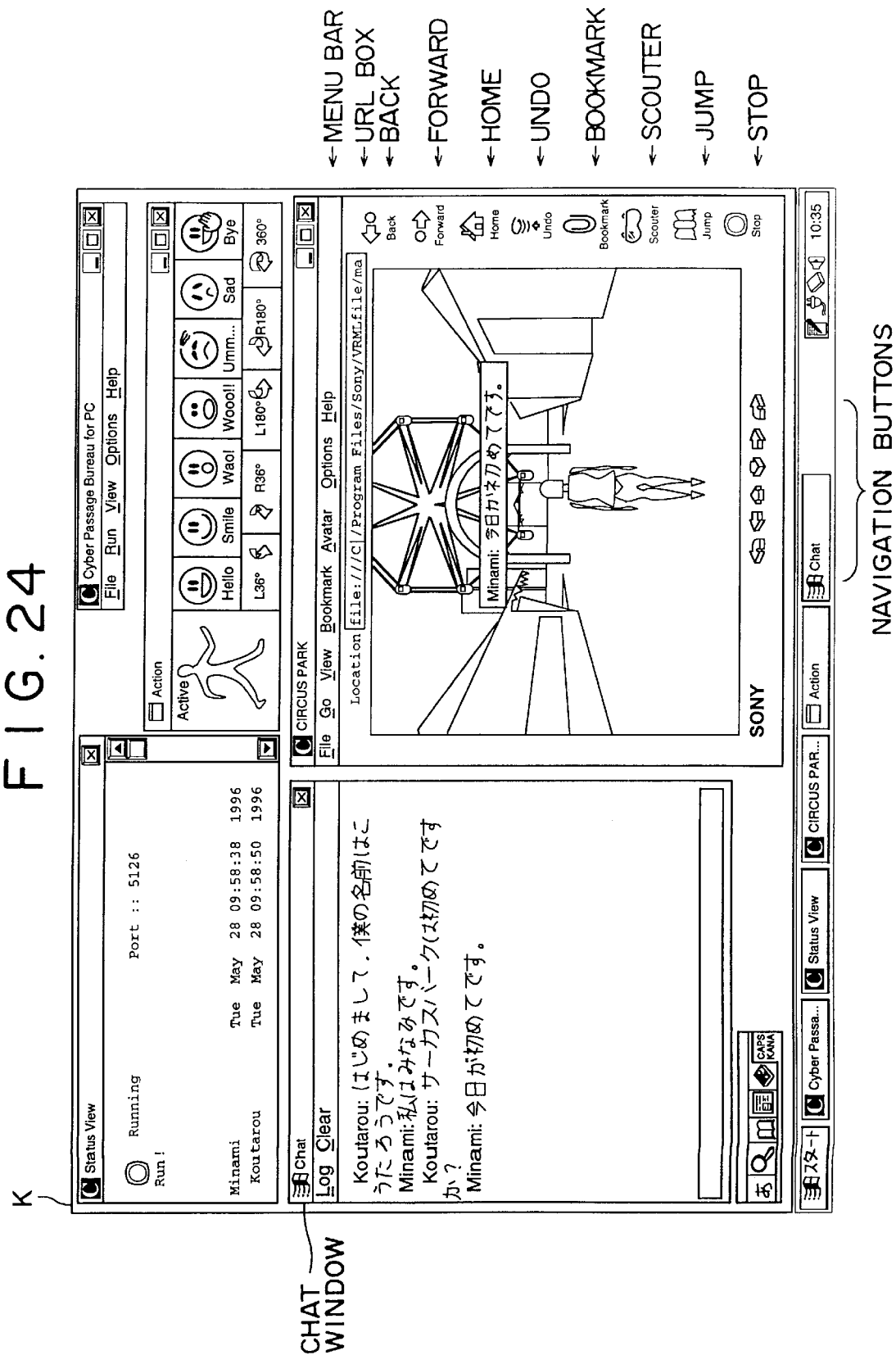
FIG. 24 is a diagram illustrating yet another example of display on the shared server terminal 11B-1 of FIG. 19.

Operating toolbar buttons:

Buttons in the toolbar shown in FIG. 24 for example may be used to execute frequently used functions.

| | |
|---|---|
| "Back" | Go back to the world read last. |
| "Forward" | Go to the world after going back to the previous world. |
| "Home" | Move to the home position. |
| "Undo" | Return a moved object to the original position (to be described later). |
| "Bookmark" | Attach a bookmark to the current world or position. |
| "Scouter" | Enter in the scouter mode (to be described later). |
| "Jump" | Enter the jumping eye mode. |

Scouter mode:

Each object placed in a virtual world may have a character string as information by using the E-VRML capability.

(1) Click "Scouter" button on the right of screen, and the user enters the scouter mode.

(2) When the mouse cursor moves onto an object having an information label, the information label is displayed.

(3) Click "Scouter" button again, and the user exits the scouter mode.

Moving an object around:

With "Alt" (Alternate) key, not shown, on the keyboard 49*a* pressed, press the left button of the mouse 49*b* on a desired object, and the user can move that object to a desired position with the mouse. This is like moving a coffee cup for example on a desk with the hand in the real world. In the virtual reality, however, objects that can be moved are those having movable attributes. In the sample world, objects may be moved by Digital HandyCam (trademark) and the like. It should be noted that a moved object may be restored to the position before behavior only once by using "Undo" button.

Connecting to a multi-user server terminal:

CyberPassage Browser provides a multi-user capability. The multi-user capability allows a plurality of users to share the same VRML virtual space. Currently, the applicant hereof is operating CyberPassage Bureau in the Internet on an experimental basis. By loading "Chat Room", the server terminal can be connected to share the same VRML virtual space with other users, walking together, turning off a room light, having a chat, and doing other activities for example.

This capability is started as follows:
(1) Make sure that the user's personal computer is linked to the Internet.
(2) Load the "Chatroom" of the sample world into Cyber-Passage Browser. This is done by loading "\Sony\readme.htm" from the sample CD-ROM and clicking "Chat Room".
(3) Appearance of "Connected to VS Server" in the message window indicates a successful connection.

Figure 26:
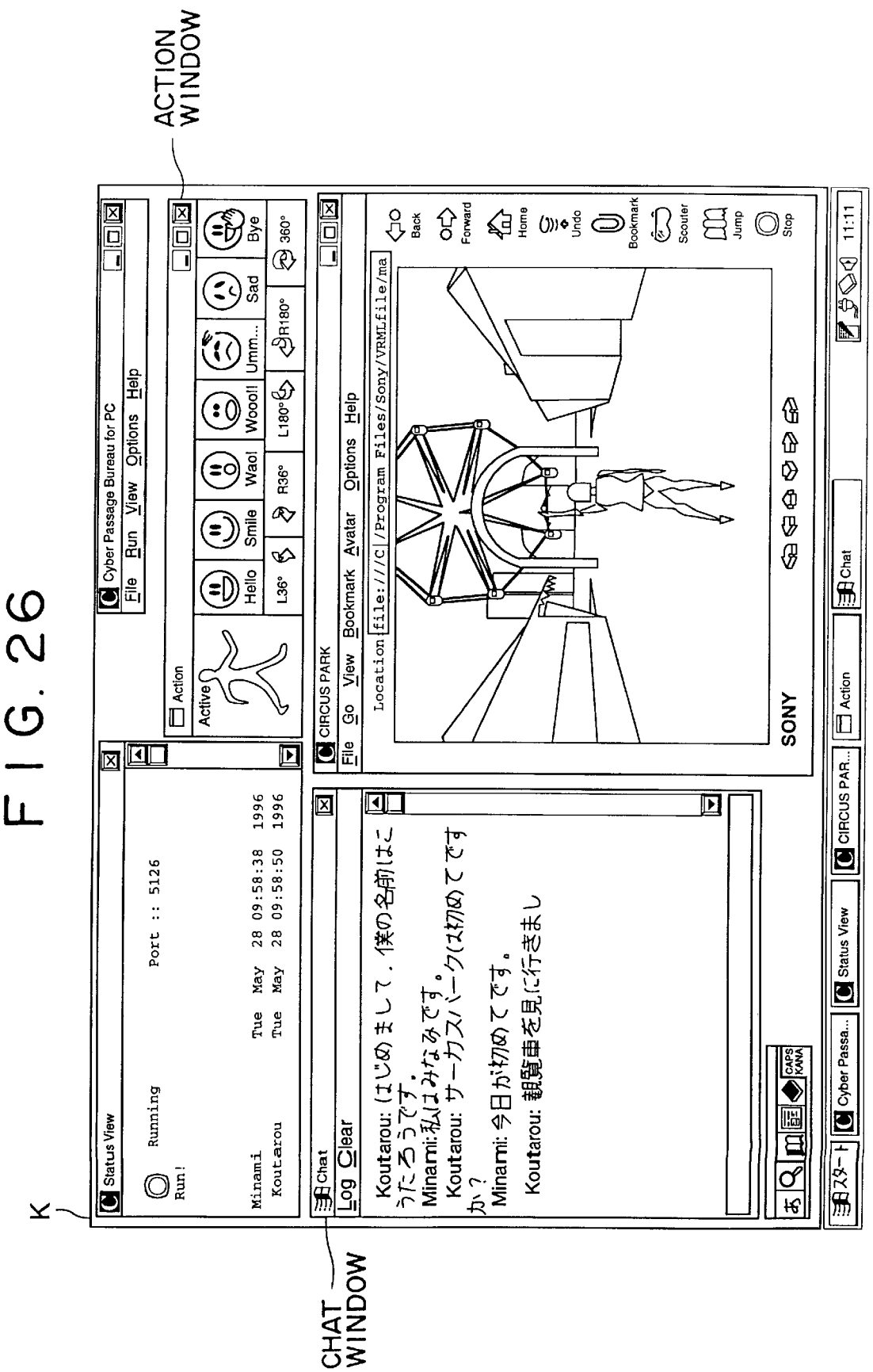
FIG. 26 is a diagram illustrating an example of display on the shared server terminal 11B-1 of FIG. 19.

Thus, the connection to the server has been completed. Interaction with other users is of the following two types:
(a) Sending others an action:

This is implemented by clicking any of "Hello", "Smile", "Wao!", "Wooo!!", "Umm . . .", "Sad", "Bye" and so on in the "Action" window (refer to FIG. 26). The actions include rotating the user himself (avatar) right or left 36 degrees, 180 degrees or 360 degrees.
(b) Talking with others:

This capability is implemented by opening the "Chat" window (refer to FIG. 26) in "View . . . Chat" menu and entering a message from the keyboard 49a into the bottom input column.

Multi-user worlds:

The following three multi-user worlds are provided by the sample CD-ROM. It should be noted that a chat can be made throughout these three worlds commonly.

(1) Chat Room

This is a room in which chats take place. Some objects in this room are shared among multiple users. There are objects which are made gradually transparent every time the left button of the mouse is pressed, objects which are used to turn off room lights, and objects which hop up when clicked, by way of example. Also, there are hidden holes and the like.

(2) Play with a ball

When a ball in the air is clicked, the ball flies toward the user who clicked the ball. This ball is shared by all users sharing that space to play catch.

(3) Share your drawing

A whiteboard is placed in the virtual space. When it is clicked by the left button, the shared whiteboard is displayed. Dragging with the left button draws a shape on the whiteboard, the result being shared by the users sharing the space.

In addition to CyberPassage Browser, the sample CD-ROM also stores CyberPassage Conductor and some sample VRML files. CyberPassage Bureau is not stored in this CD-ROM, however. It can be downloaded via the Internet 15A. The Sony Corporation also offers, via the Internet, the multi-user world URL=http://japan.park.org/japan/Sony/3DWorld/Circus/.

Use of CyberPassage Bureau allows the users using CyberPassage Browser to enter together in a world described in VRML 1.0. To provide a three-dimensional virtual reality space for enabling this capability, a file described in VRML 1.0 must be prepared. Then, CyberPassage Bureau (hereinafter appropriately referred to simply as the bureau) is operated on an appropriate personal computer. Further, a line telling the personal computer on which the Bureau is operating is added to the VRML 1.0 file. The resultant VRML file is read into CyberPassage Browser (hereinafter appropriately referred to simply as the browser), the browser is connected to the bureau.

If this connection is successful, the users in the virtual world can see each other and talk with each other. Further, writing an appropriate script into the file allows each user to express emotions through a use of an action panel.

CyberPassage Browser provides interface for action description through use of TCL. This interface allows each user to provide behaviors to objects in the virtual world and, if desired, make the resultant objects synchronize between browsers. This allows a plurality of users to play a three-dimensional game if means for it are prepared.

To enjoy a multi-user virtual world, three steps are required; preparation of a VRML file, start of CyberPassage Bureau, and connection of CyberPassage Browser.

Preparing a VRML file:

First, a desired VRML. 1.0 file must be prepared. This file is created by oneself or a so-called freeware is used for this file. This file presents a multi-user virtual world.

Starting CyberPassage Bureau:

The operating environment of CyberPassage Bureau is as follows:

| CPU | . . . 486SX or higher |
|---|---|
| OS | . . . Window 95 |
| Memory | . . . 12M or higher |

CyberPassage Bureau can be started only by executing the downloaded file. When this CyberPassage Bureau is executed, only a menu bar indicating menus is displayed as shown in FIG. 21. Just after starting, CyberPassage Bureau is in a stopped state. Selecting "status" by pulling down "View" menu displays the status window that indicates the current CyberPassage Bureau state. At the same time, a port number waiting for connection is also shown.

Immediately after starting, CyberPassage Bureau is set such that it waits for connection at TCP port No. 5126. To change this port number, pull down "options" menu and select "port". When entry of a new port number is prompted, enter a port number 5000 or higher. If the user does not know which port number to enter, default value (5126) can be used.

To start CyberPassage Bureau from the stopped state, pull down the "run" menu and select "start". The server terminal comes to be connected at the specified port. At this moment, the state shown in "status" window becomes "running" as shown in FIG. 21.

Thus, after completion of the bureau preparations, when CyberPassage Browser comes to connect to CyberPassage Bureau, it tells the position of the browser to another browser or transfers information such as conversation and behavior.

The "status" window of CyberPassage Bureau is updated every time a connection is made by the user, so that using this window allows the user to make sure of the users existing in that virtual world.

Connection of CyberPassage Browser:

Connection of the CyberPassage Browser requires the following two steps. First, CyberPassage Browser is instructed as to which bureau it is to be connected. This is done by writing an "info" node to the VRML file. Second, the user's avatar file is copied to an appropriate direction so that the user can be seen by the other users.

Adding to a VRML file:

When writing a line specifying the bureau to be connected to the VRML file, a name of the personal computer on which the bureau is operating and the port number must be specified in the following format:

DEF VsServer Into {string"server name:port number"}

The server terminal name is a machine name as used in the Internet on which the bureau is operating (for example, fred.research.sony.com) or its IP address (for example, 123.231.12.1). The port number is one set in the bureau.

Consequently, the above-mentioned format becomes as follows for example:

DEF VsServer Info {string"fred.research.sony.com:5126"}

In the example of FIG. 19, the IP address of the shared server terminal 11-1 is 43.0.35.117, so that the above-mentioned format becomes as follows:

DEF VsServer Info {string"43.0.35.117:5126"}

This is added below the line shown below of the prepared VRML file:

VRML V1.0 ascii

Copying an avatar file:

When CyberPassage Browser gets connected to CyberPassage Bureau, the former notifies the latter of its avatar. When a specific avatar meets another, the bureau notifies the other browsers of the meeting information to cause the specific avatar be displayed on the other browsers. For this reason, it is required to copy the VRML file of the specific avatar to an appropriate place in advance.

FIG. 21 shows an example of display for selecting an avatar. In this example, a desired avatar can be selected as own avatar from "person.wrl", "boy.wrl" or "girl.wrl".

When the selected avatar file is copied to the same directory in which own VRML file is stored, the browser searches the directory for the "{person,boy,girl}.wrl" file as the avatar file when the browser loads the VRML file.

Thus, to share a specific VRML file, CyberPassage Bureau may only be operated, the VsServer Info node is added to the VRML file, and "{person.boy.girl}wrl" is copied to the same file in which the VRML file is stored. Then, when the VRML file is set up such that the same can be loaded from other users, any user who reads the file through CyberPassage gets connected to the bureau.

Figure 22:
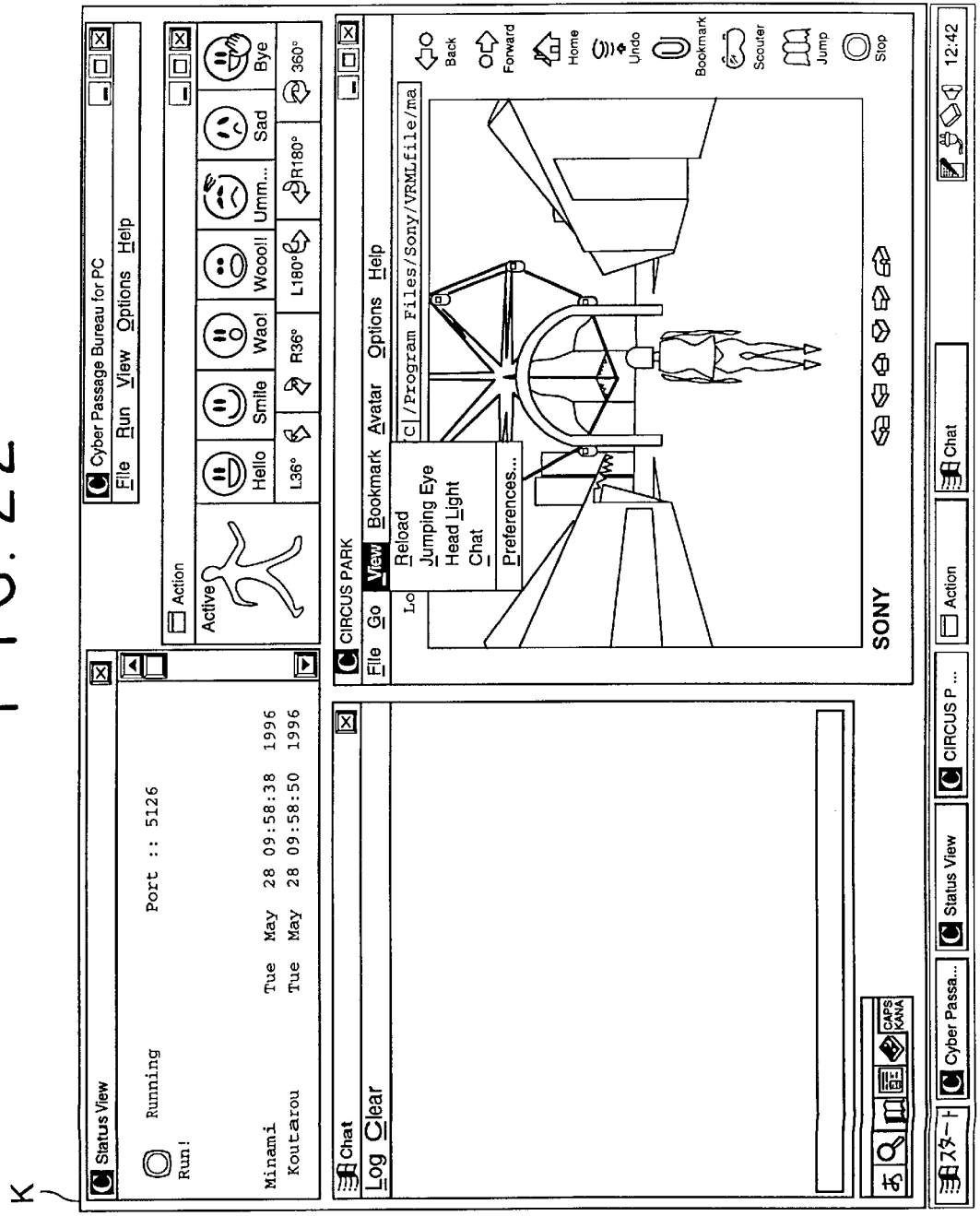
FIG. 22 is a diagram illustrating another example of display on the shared server terminal 11B-1 of FIG. 19.

As shown in FIG. 19, it is assumed that the shared server terminal 11B-1 uses an avatar nicknamed Koutarou and the client terminal 13-1 uses an avatar nicknamed Minami to walk through one of the multi-user worlds, CIRCUS PARK. In doing so, the shared server terminal 11B-1 selects a male avatar "boy.wrl" as shown in FIG. 21 for example. As shown in FIG. 22, when "View" menu is pulled down and "Preferences" is selected, a screen as shown in FIG. 23 is displayed. On this screen, the user specifies "Koutarou" as the name (Nick Name) of the avatar selected in FIG. 21.

Figure 25:
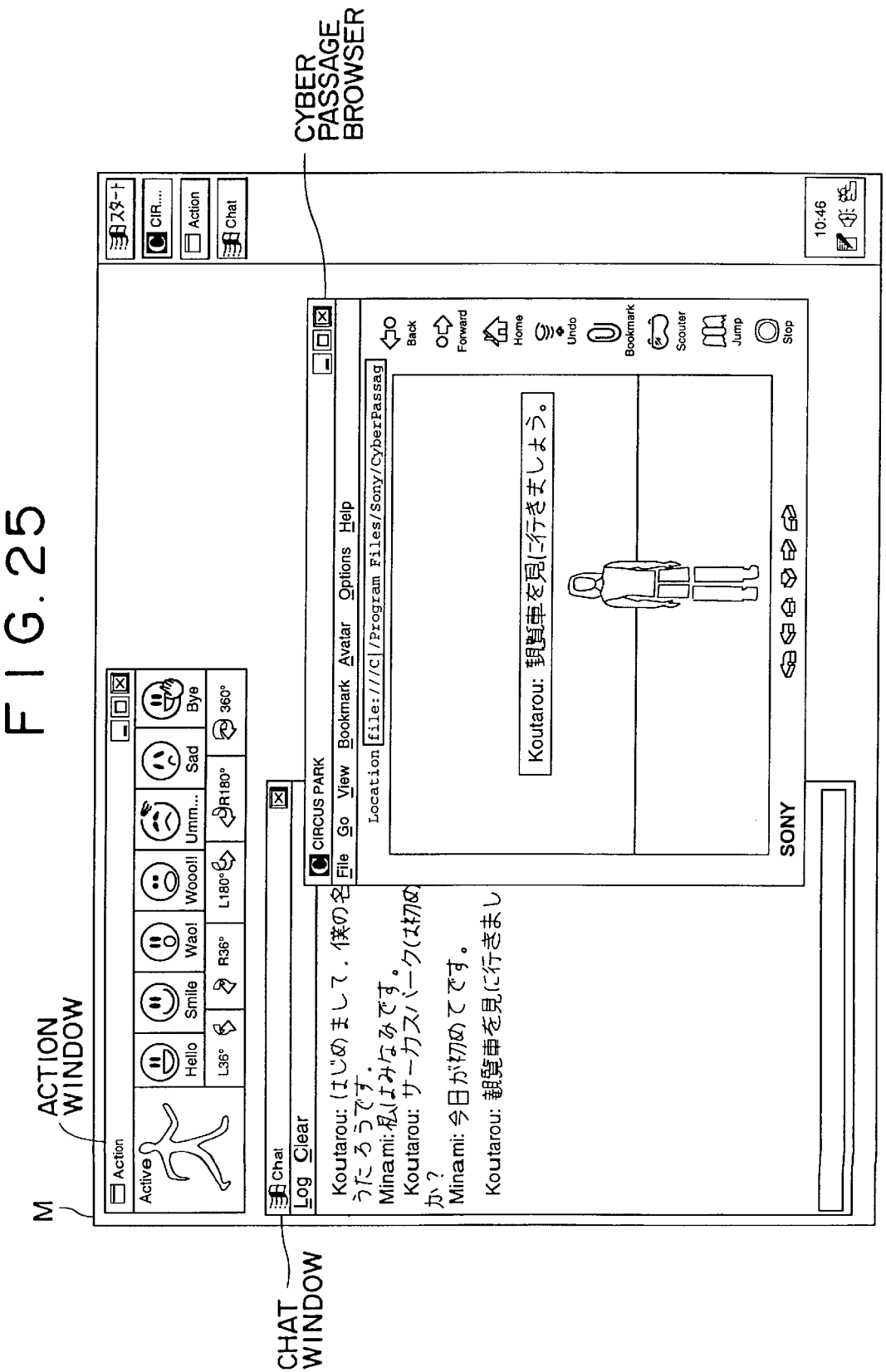
FIG. 25 is a diagram illustrating an example of display on the client terminal 13-1 of FIG. 19.

Likewise, the user of the client terminal 13-1 selects "girl.wrl" as their own avatar. For example, the user may specify "Minami" as its nickname, and enter CIRCUS PARK. When avatar Koutarou of the shared server terminal 11B-1 and avatar Minami of the client terminal 13-1 move to positions close enough to each other, avatar Minami is displayed on the display device 25 of the shared server terminal 11B-1 as shown in FIG. 24. Likewise, avatar Koutarou is displayed on the display device 45 of the client terminal 13-1 as shown in FIG. 25 to be described later.

It should be noted that, in FIGS. 19 and 21 through 28, "K" is assigned to the display screen of the display device 25 that avatar Koutarou sees and "M" is assigned to the display screen of the display device 45 that avatar Minamni sees.

As shown in the figures, each display device displays only the three-dimensional virtual reality space (including the image of the other avatar) as viewed from own avatar, and the user's own avatar itself is not displayed.

Thus, when a plurality of avatars approach each other close enough in a specific space (namely, when own avatar is displayed on the display device of the other user's display device), a chat can be performed by selecting "Chat" from "View" menu shown in FIG. 24 for example. FIG. 24 shows an example of display on the display device 25 of the shared server terminal 11B-1 when avatars Koutarou and Minami are having a chat.

As shown in FIG. 24, the messages entered so far from the keyboards of the terminals concerned are shown in the "Chat" window. Characters entered by the user are once displayed in the display area at the bottom of the "Chat" window; when the Enter key, not shown, of the keyboard 49a is pressed, the entered message (character string) is transmitted to the other user. For example, when message "Yes, it's my first visit today" has come from avatar Minami (the client terminal 13-1) to the shared server terminal 11B-1, this message is displayed in a balloon above avatar Minami in the CyberPassage Bureau window on the display device 25 of the shared server terminal 11B-1 as shown in FIG. 24 and, at the same time, displayed in the "Chat" window, which also shows past messages.

FIG. 25 shows an example of display on the display device 45 of the client terminal 13-1 when message "Let's go see the merry-go-round" has been entered from the shared server terminal 11B-1. In this case, too, the message is displayed in a balloon above avatar Koutarou in the "CIRCUS PARK" window and, at the same time, displayed in the "Chat" window after the past messages.

An example of display of FIG. 26 shows the case in which "Hello" button has been pressed on the client terminal 13-1. At this time, as shown in FIG. 26, an image in which avatar Minami raises its right hand is displayed on the shared server terminal 11B-1 and, at the same time, voice message "Hello" is heard from the speaker 27.

Figure 27:
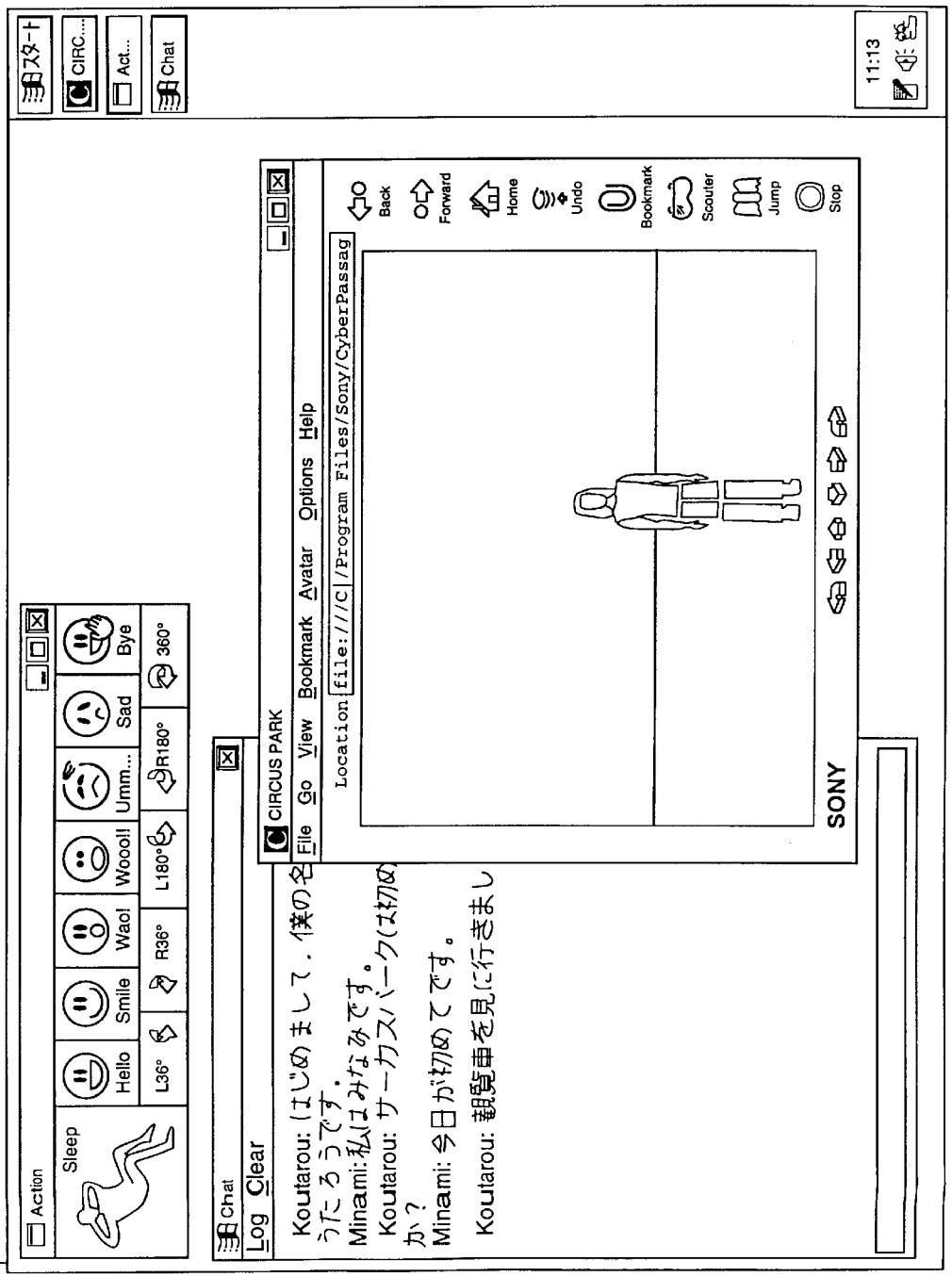
FIG. 27 is a diagram illustrating another example of display of the client terminal 13-1 of FIG. 19.
Figure 28:
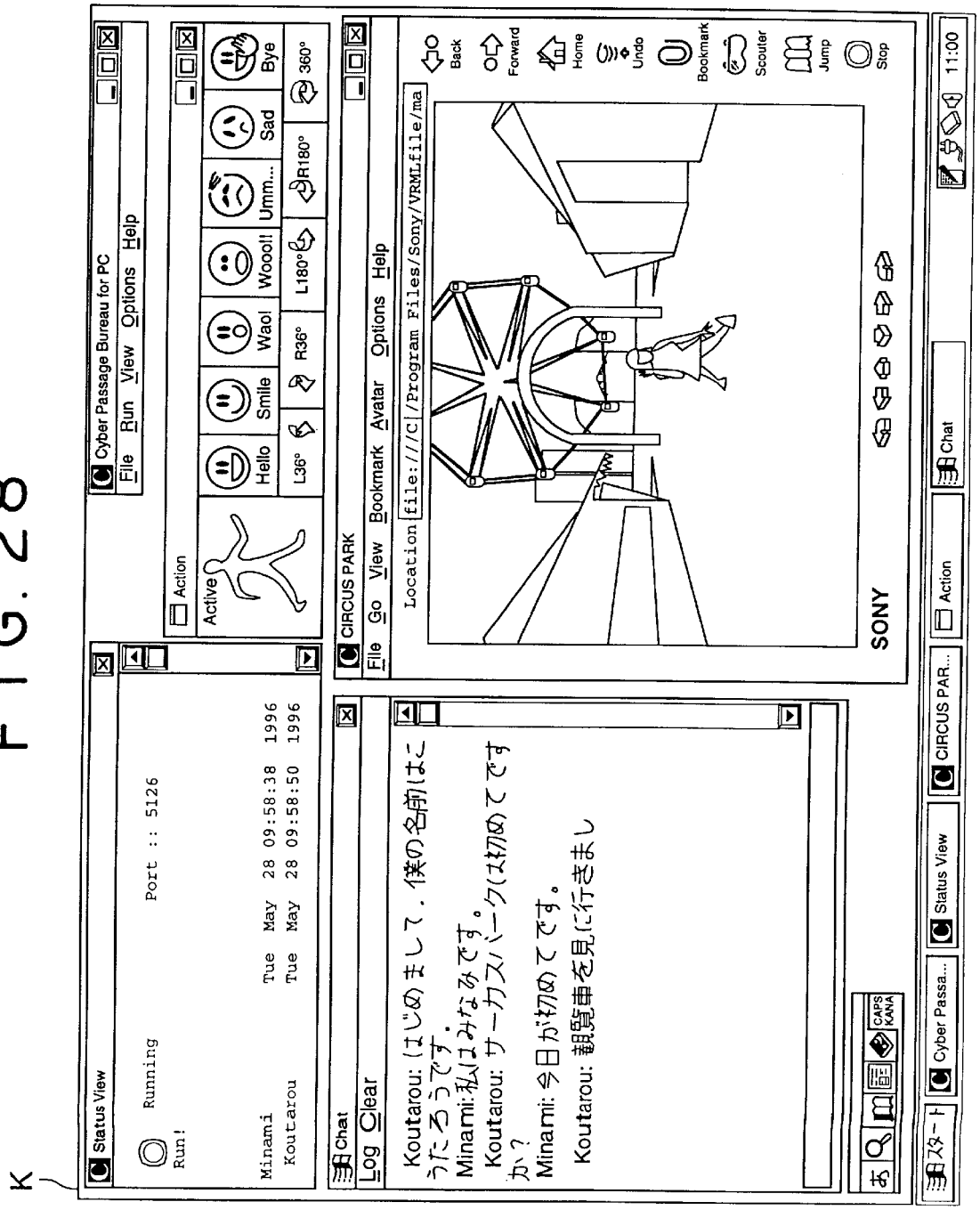
FIG. 28 is a diagram illustrating another example of display on the shared server terminal 11B-1 of FIG. 19.
Figure 29:
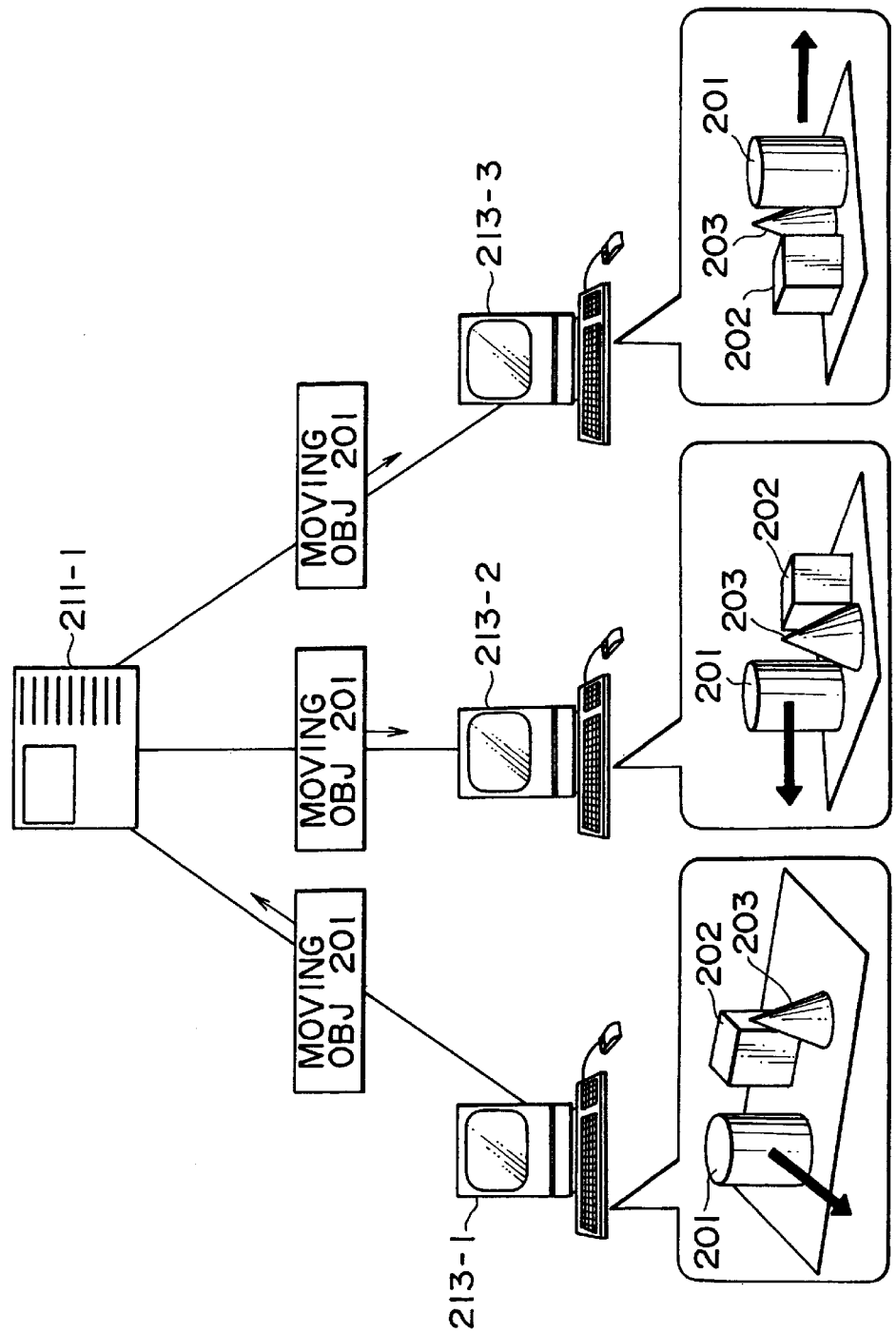
FIG. 29 is a diagram describing a related art method of controlling objects.

When the user leaves his terminal, his avatar may be put in the sleep state. For example, to put avatar Minami in the sleep state, "Active" button, one of the action buttons in the action windows shown in FIG. 25, is clicked on the client terminal 13-1 to change the shape of this button to "Sleep" button as shown in FIG. 27. Avatar Minami enters the sleep state. In the sleep state, avatar Minami displayed on the displayed device 25 of the shared server terminal 11B-1 is sitting on the ground as shown in FIG. 28. The user of the shared server terminal 11B-1 can know from this state (namely, the user avatar Minami has left the client terminal 13-1) that avatar Minami is in the sleep state. When "Sleep" button is clicked in the sleep state, the button returns to "Active" button again.

Thus, the users can enjoy themselves walking through the Circus Park as a three-dimensional virtual reality space.

The present invention is applicable to dynamically control IDs of a variety of update objects existing in the above-mentioned Circus Park.

The present invention has been described by taking for example the case in which the Internet is used for the network 15 and the WWW system is used. It will be apparent to those skilled in the art that a global communications network other than the Internet may be used for the network 15 and a communications system other than the WWW system may be used to achieve the above-mentioned objects of the invention.

As described above, according to the present invention, in the three-dimensional virtual reality space sharing system, the three-dimensional virtual reality space sharing method, the information recording medium, the information recording method, the information transmission medium, and the information transmission method, a local identification code corresponding to an object is separately set on each client terminal. On the shared server terminal, the local identification code is converted to a global identification code by means of a conversion table previously registered in the shared server terminal. This novel setup facilitates the dynamic control of the identification codes of objects involved in the customization such as object addition and deletion, allows each of the client terminals to control the minimum necessary object identification codes, and allows the implementation of a system in which unspecified users share a three-dimensional virtual reality space.

Further, according to the present invention, in the three-dimensional virtual reality space sharing method, the server terminal, the information recording medium, the information recording method, the information transmission medium, and the information transmission method, a conversion table indicating the relationship between a local identification code corresponding to each object set separately to each client terminal and a global identification code controlled by the shared server terminal is stored in the shared server terminal and a local identification code of an object specified by a specific client terminal is converted to a global identification code by the conversion table to control the state of each object. This novel setup allows the provision of a three-dimensional virtual reality space easy in object control to each of the client terminals.

While the preferred embodiments of the present invention have been described using specific terms, such description is for illustrative purposes only, and it is to be understood that changes and variations may be made without departing from the spirit or scope of the appended claims.

What is claimed is:

1. A method of sharing a three-dimensional virtual reality space comprising the steps of:

connecting a plurality of client terminals for displaying a three-dimensional virtual reality space, including a plurality of three-dimensional objects, to a shared server terminal for controlling states of the plurality of three-dimensional objects via a communication network;

setting a plurality of local identification codes, each local identification code uniquely identifying each of the plurality of three-dimensional objects displayed on each of the plurality of client terminals; and controlling the states of the plurality of three-dimensional objects in the plurality of client terminals by converting on the shared server terminal the local identification codes identifying the three-dimensional objects whose states are to be controlled into a corresponding global identification code by use of a conversion table registered in the shared server terminal in advance, wherein the conversion allows the shared server terminal to use the local identification code of a three-dimensional object displayed within one client terminal and the corresponding global identification code to identify associated local identification codes, and wherein the conversion allows other client terminals to receive the associated local identification codes and associated update information and in accordance therewith update corresponding three-dimensional objects within the three-dimensional virtual reality space displayed on the other client terminals.

2. The method of sharing a three-dimensional virtual reality space according to claim 1, further comprising the steps of:

updating, on one of the plurality of client terminals, the state of any of the plurality of three-dimensional objects according to an operation made by a user of the client terminal; and notifying the shared server terminal of update information about the update of any of the plurality of three-dimensional objects along with the corresponding local identification code.

3. The method of sharing a three-dimensional virtual reality space according to claim 2, wherein the update information about the update of any of the plurality of three-dimensional objects is information associated at least one of behavior, rotation, and change in color of the updated three-dimensional object in the three-dimensional virtual reality space.

4. The method of sharing a three-dimensional virtual reality space according to claim 1, further comprising the step of:

transferring the local identification codes between the plurality of client terminals and the shared server terminal over the communication network according to a communication protocol known as TCP/IP (Transmission Control Protocol/Internet Protocol), wherein the plurality of client terminals are unspecified.

5. The method of sharing a three-dimensional virtual reality space according to claim 1, further comprising the step of:

representing the plurality of three-dimensional objects by three-dimensional graphics data described in VRML (Virtual Reality Modeling Language).

6. A system of sharing a three-dimensional virtual reality space comprising:

a shared server terminal;

a connecting means for connecting a plurality of client terminals for displaying a three-dimensional virtual reality space, including a plurality of three-dimensional objects, to the shared server terminal for controlling states of the plurality of three-dimensional objects via a communication network;

a setting means for setting a plurality of local identification codes that each uniquely identify each of the plurality of three-dimensional objects displayed on each of the plurality of client terminals; and a conversion table registered in the shared server terminal in advance for converting the local identification codes that identify three-dimensional objects whose states are to be controlled into a corresponding global identification code wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals.

7. An information recording medium for use in a three-dimensional virtual reality space sharing system, the information recording medium having recorded thereon a computer program comprising the processing steps of:

connecting a plurality of client terminals for displaying a three-dimensional virtual reality space, including a plurality of three-dimensional objects, to a shared server terminal for controlling states of the plurality of three-dimensional objects via a communication network;

setting a plurality of local identification codes, each local identification code uniquely identifying each of the plurality of three-dimensional objects displayed on each of the plurality of client terminals; and converting the local identification codes that identify three-dimensional objects whose state is to be controlled into a corresponding global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is recorded on the information recording medium in a state readable and executable by at least one of the shared server terminal and the client terminals.

8. An information recording method for use in a three-dimensional virtual reality space sharing system, the information recording method recording a computer program comprising the processing steps of:

connecting a plurality of client terminals for displaying a three-dimensional virtual reality space, including a plurality of three-dimensional objects, to a shared server terminal for controlling states of the plurality of three-dimensional objects via a communication network;

setting a plurality of local identification codes, each local identification code uniquely identifying each of the plurality of three-dimensional objects displayed on each of the plurality of client terminals; and converting the local identification codes that identify three-dimensional objects whose states are to be controlled into a corresponding global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is recorded on the information recording medium in a state readable and executable by at least one of the shared server terminal and the client terminals.

9. An information transmission medium for use in a three-dimensional virtual reality space sharing system, the information transmission medium transmitting a computer program comprising the processing steps of:

connecting a plurality of client terminals for displaying a three-dimensional virtual reality space, including a plurality of three-dimensional objects, to a shared server terminal for controlling states of the plurality of three-dimensional objects via a communication network;

setting a plurality of local identification codes, each local identification code uniquely identifying each of the plurality of three-dimensional objects displayed on each of the plurality of client terminals; and converting the local identification codes that identify three-dimensional objects whose states are to be controlled into a corresponding global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is receivable by at least one of the shared server terminal and the client terminals and transmitted to at least one of the shared server terminal and the client terminals in an executable state.

10. An information transmission method for use in a three-dimensional virtual reality space sharing system, the information transmission method transmitting a computer program comprising the processing steps of:

connecting a plurality of client terminals for displaying a three-dimensional virtual reality space, including a plurality of three-dimensional objects, to a shared server terminal for controlling states of the plurality of three-dimensional objects via a communication network;

setting a plurality of local identification codes, each local identification code uniquely identifying each of the plurality of three-dimensional objects displayed on each of the plurality of client terminals; and converting the local identification codes that identify three-dimensional objects whose states are to be controlled into a corresponding global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is receivable by at least one of the shared server terminal and the client terminals and transmitted to at least one of the shared server terminal and the client terminals.

11. An information processing method of a shared server terminal in a three-dimensional virtual reality space sharing system in which a plurality of client terminals for displaying a three-dimensional virtual reality space, including a plurality of three-dimensional objects, are connected to a shared server terminal for controlling the state of each of the plurality of three-dimensional objects in each of the plurality of client terminals via a communication network, the information processing method comprising the steps of:

transferring a local identification code uniquely identifying one of the plurality of three-dimensional objects on one of the plurality of client terminals via the communication network; and converting the local identification code into a global identification code wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals.

12. A shared server terminal in a three-dimensional virtual reality space sharing system in which a plurality of client terminals for displaying a three-dimensional virtual reality space, including a plurality of three-dimensional objects, are connected to a shared server terminal for controlling the state of each of the plurality of three-dimensional objects in each of the plurality of client terminals via a communication network, the shared server terminal comprising:

a communication means for transferring a local identification code uniquely identifying one of the plurality of three-dimensional objects on one of the plurality of client terminals via the communication network; and a conversion table for converting the local identification code into a global identification code wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals.

13. An information recording medium for use in a shared server terminal in a three-dimensional virtual reality space sharing system in which a plurality of client terminals for displaying a three-dimensional virtual reality space, including a plurality of three-dimensional objects, are connected to a shared server terminal for controlling the state of each of the plurality of three-dimensional objects in each of the plurality of client terminals via a communication network, the information recording medium having recorded thereon a computer program comprising the processing steps of:

transferring a local identification code uniquely identifying one of the plurality of three-dimensional objects on one of the plurality of client terminals via the communication network; and converting a local identification code into a global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is recorded in the information recording medium in a state readable and executable by the shared server terminal.

14. An information recording method for use in a shared server terminal in a three-dimensional virtual reality space sharing system in which a plurality of client terminals for displaying a three-dimensional virtual reality space, including a plurality of three-dimensional objects, are connected to a shared server terminal for controlling the state of each of the plurality of three-dimensional objects in each of the plurality of client terminals via a communication network, the information recording method recording a computer program comprising the processing steps of:

transferring a local identification code uniquely identifying one of the plurality of three-dimensional objects on one of the plurality of client terminals via the communication network; and converting the local identification code into a global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is recorded in the information recording medium in a state readable and executable by the shared server terminal.

15. An information transmitting medium for use in a shared server terminal in a three-dimensional virtual reality space sharing system in which a plurality of client terminals for displaying a three-dimensional virtual reality space, including a plurality of three-dimensional objects, are connected to a shared server terminal for controlling the state of each of the plurality of three-dimensional objects in each of the plurality of client terminals via a communication network, the information transmission medium transmitting a computer program comprising the processing steps of:

transferring a local identification code uniquely identifying one of the plurality of three-dimensional objects on one of the plurality of client terminals via the communication network; and converting the local identification code into a global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is transmitted to the shared server terminal in a state receivable and executable by the shared server terminal.

16. An information transmission method for use in a shared server terminal in a three-dimensional virtual reality space sharing system in which a plurality of client terminals for displaying a three-dimensional virtual reality space, including a plurality of three-dimensional objects, are connected to a shared server terminal for controlling the state of each of the plurality of three-dimensional objects in each of the plurality of client terminals via a communication network, the information transmission method transmitting a computer program comprising the processing steps of:

transferring a local identification code uniquely identifying one of the plurality of three-dimensional objects on one of the plurality of client terminals via the communication network; and converting the local identification code into a global identification code;

wherein the converting allows the shared server terminal to use the local identification code of a three-dimensional object displayed within one client terminal and the corresponding global identification code to identify associated local identification codes, and wherein the converting allows other client terminals to receive the associated local identification codes and associated update information and in accordance therewith update corresponding three-dimensional objects within the three-dimensional virtual reality space displayed on the other client terminals, and wherein the computer program is transmitted to the shared server terminal in a state receivable and executable by the shared server terminal.

17. A system for controlling a virtual reality space which includes a three-dimensional object, the system comprising:

a shared server terminal for controlling the three-dimensional object, where the shared server terminal identifies the three-dimensional object by a global identification code;

a communication network;

a client terminal for receiving information about the three-dimensional object from the shared server terminal over the communication network and sending the information about the three-dimensional object to the shared server terminal over the communication network, where the client terminal identifies the three-dimensional object by a local identification code; and a conversion table which can be used to convert the local identification code into the global identification code wherein the conversion table allows the shared server terminal to use the local identification code of a three-dimensional object transmitted to/from the client terminal and the global identification code to identify an associated local identification code, and wherein the conversion table allows another client terminal to receive the associated local identification code and the information about the three-dimensional object and in accordance therewith update the three-dimensional object within the three-dimensional virtual reality space.

18. A method of controlling a virtual reality space which includes a three-dimensional object, the method comprising the steps of:

controlling the three-dimensional object by a shared server terminal which identifies the three-dimensional object by a global identification code;

transferring information about the three-dimensional object between the shared server terminal and a client terminal over a communication network, where the client terminal identifies the three-dimensional object by a local identification code; and converting the local identification code into the global identification code using a conversion table wherein the converting allows the shared server terminal to use the local identification code of the three-dimensional object transmitted to/from the client terminal and the global identification code to identify an associated local identification code, and wherein the conversion table allows another client terminal to receive the associated local identification code and the information about the three-dimensional object and in accordance therewith update the three-dimensional object within the three-dimensional virtual reality space.

* * * * *